United States Patent
Gashkov et al.

(10) Patent No.: US 8,312,072 B2
(45) Date of Patent: Nov. 13, 2012

(54) UNIVERSAL GALOIS FIELD MULTIPLIER

(75) Inventors: Sergei B. Gashkov, Moscow (RU);
Alexandre Andreev, San Jose, CA (US)

(73) Assignee: LSI Corporation, Milpitas, CA (US)

(*) Notice: Subject to any disclaimer, the term of this patent is extended or adjusted under 35 U.S.C. 154(b) by 1093 days.

(21) Appl. No.: 12/211,268

(22) Filed: Sep. 16, 2008

(65) Prior Publication Data

US 2010/0070548 A1 Mar. 18, 2010

(51) Int. Cl.
*G06F 7/72* (2006.01)
(52) U.S. Cl. .................................................. 708/492
(58) Field of Classification Search .................. None
See application file for complete search history.

(56) References Cited

U.S. PATENT DOCUMENTS

| | | | | |
|---|---|---|---|---|
| 6,701,336 | B1* | 3/2004 | Shen et al. | 708/492 |
| 2001/0007111 | A1* | 7/2001 | Blake et al. | 708/492 |
| 2003/0135530 | A1* | 7/2003 | Parthasarathy et al. | 708/492 |
| 2005/0267926 | A1* | 12/2005 | Al-Khoraidly et al. | 708/492 |
| 2010/0007111 | A1* | 1/2010 | Adams | 280/210 |

* cited by examiner

*Primary Examiner* — David H Malzahn
(74) *Attorney, Agent, or Firm* — Christopher P. Maiorana, PC

(57) ABSTRACT

An apparatus including a multiplier circuit and a multiplexing circuit. The multiplier circuit may be configured to multiply a first multiplicand and a second multiplicand based on a programmable base value and generate a plurality of intermediate values, each intermediate value representing a result of the multiplication reduced by a respective irreducible polynomial. The multiplexing circuit may be configured to generate an output in response to the plurality of intermediate values received from the multiplier circuit and the programmable base value.

20 Claims, 16 Drawing Sheets

| 126 |  |  |  |  |  |  |  |  |
|---|---|---|---|---|---|---|---|---|
| LINEAR TRANSFORM | | | | | | | | |
| 170a | 170b | 170c | 170d | 170e | 170f | 170g | 170h | 170n |
| C mod $P_0$ | C mod $P_1$ | C mod $P_2$ | C mod $P_3$ | C mod $P_4$ | C mod $P_5$ | C mod $P_6$ | C mod $P_7$ | C mod $P_8$ |

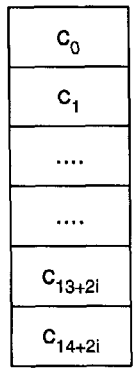
FIG. 6
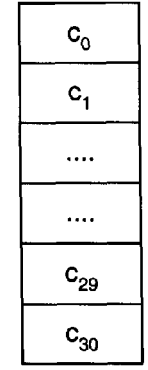
FIG. 8
| $L_{i,0,0}$ | $L_{i,0,1}$ | ... | ... | ... | ... | ... | $L_{i,0,13+2i}$ | $L_{i,0,14+2i}$ |
|---|---|---|---|---|---|---|---|---|
| $L_{i,1,0}$ | $L_{i,1,1}$ | ... | ... | ... | ... | ... | $L_{i,1,13+2i}$ | $L_{i,1,14+2i}$ |
| ... | ... | ... | ... | ... | ... | ... | ... | ... |
| ... | ... | ... | ... | ... | ... | ... | ... | ... |
| $L_{i06+i,0}$ | $L_{i06+i,1}$ | ... | ... | ... | ... | ... | $L_{i,6+i,13+2i}$ | $L_{i,6+i,14+2i}$ |
| $L_{i,7+i,0}$ | $L_{i,7+i,1}$ | ... | ... | ... | ... | ... | $L_{i,7+i,13+2i}$ | $L_{i,7+i,14+2i}$ |
FIG. 7

|     | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ | $c_{21}$ | $c_{22}$ | $c_{23}$ | $c_{24}$ |
| --- | --- | --- | --- | --- | --- | --- | --- | --- | --- | --- | --- | --- | --- | --- | --- | --- | --- | --- | --- | --- | --- | --- | --- | --- | --- |
| $b_0$ | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 1 | 1 | 0 |
| $b_1$ | 0 | 1 | 0 | 0 | 0 | 0 | 0 | 0 | 0 | 0 | 0 | 0 | 0 | 1 | 1 | 0 | 0 | 0 | 0 | 0 | 0 | 0 | 1 | 0 | 1 |
| $b_2$ | 0 | 0 | 1 | 0 | 0 | 0 | 0 | 0 | 0 | 0 | 0 | 0 | 0 | 0 | 1 | 1 | 0 | 0 | 0 | 0 | 0 | 0 | 0 | 1 | 1 |
| $b_3$ | 0 | 0 | 0 | 1 | 0 | 0 | 0 | 0 | 0 | 0 | 0 | 0 | 0 | 1 | 0 | 1 | 1 | 0 | 0 | 0 | 0 | 0 | 1 | 1 | 1 |
| $b_4$ | 0 | 0 | 0 | 0 | 1 | 0 | 0 | 0 | 0 | 0 | 0 | 0 | 0 | 1 | 1 | 0 | 1 | 1 | 0 | 0 | 0 | 0 | 1 | 0 | 1 |
| $b_5$ | 0 | 0 | 0 | 0 | 0 | 1 | 0 | 0 | 0 | 0 | 0 | 0 | 0 | 0 | 1 | 1 | 0 | 1 | 1 | 0 | 0 | 0 | 0 | 1 | 0 |
| $b_6$ | 0 | 0 | 0 | 0 | 0 | 0 | 1 | 0 | 0 | 0 | 0 | 0 | 0 | 0 | 0 | 1 | 1 | 0 | 1 | 1 | 0 | 0 | 0 | 0 | 1 |
| $b_7$ | 0 | 0 | 0 | 0 | 0 | 0 | 0 | 1 | 0 | 0 | 0 | 0 | 0 | 0 | 0 | 0 | 1 | 1 | 0 | 1 | 1 | 0 | 0 | 0 | 0 |
| $b_8$ | 0 | 0 | 0 | 0 | 0 | 0 | 0 | 0 | 1 | 0 | 0 | 0 | 0 | 0 | 0 | 0 | 0 | 1 | 1 | 0 | 1 | 1 | 0 | 0 | 0 |
| $b_9$ | 0 | 0 | 0 | 0 | 0 | 0 | 0 | 0 | 0 | 1 | 0 | 0 | 0 | 0 | 0 | 0 | 0 | 0 | 1 | 1 | 0 | 1 | 1 | 0 | 0 |
| $b_{10}$ | 0 | 0 | 0 | 0 | 0 | 0 | 0 | 0 | 0 | 0 | 1 | 0 | 0 | 0 | 0 | 0 | 0 | 0 | 0 | 1 | 1 | 0 | 1 | 1 | 0 |
| $b_{11}$ | 0 | 0 | 0 | 0 | 0 | 0 | 0 | 0 | 0 | 0 | 0 | 1 | 0 | 0 | 0 | 0 | 0 | 0 | 0 | 0 | 1 | 1 | 0 | 1 | 1 |
| $b_{12}$ | 0 | 0 | 0 | 0 | 0 | 0 | 0 | 0 | 0 | 0 | 0 | 0 | 1 | 0 | 0 | 0 | 0 | 0 | 0 | 0 | 0 | 1 | 1 | 0 | 1 |

| $c_{24}$ | ... | $c_{16}$ | $c_{15}$ | $c_{14}$ | $c_{13}$ | $c_{12}$ | $c_{11}$ | $c_{10}$ | $c_9$ | $c_8$ | $c_7$ | $c_6$ | $c_5$ | $c_4$ | $c_3$ | $c_2$ | $c_1$ | $c_0$ |
|---|---|---|---|---|---|---|---|---|---|---|---|---|---|---|---|---|---|---|
| | ... | | | | | | $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ | |
| | ... | | | | | $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ | | |
| | ... | | | | $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ | | | |

FIG. 16

| $c_{13}$ | $c_{12}$ | $c_{11}$ | $c_{10}$ | $c_9$ | $c_8$ | $c_7$ | $c_6$ | $c_5$ | $c_4$ | $c_3$ | $c_2$ | $c_1$ | $c_0$ |
|---|---|---|---|---|---|---|---|---|---|---|---|---|---|
| | | | $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ |
| | | $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ | |
| | $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ | | |

FIG. 17

| $c_{12}$ | $c_{11}$ | $c_{10}$ | $c_9$ | $c_8$ | $c_7$ | $c_6$ | $c_5$ | $c_4$ | $c_3$ | $c_2$ | $c_1$ | $c_0$ |
|---|---|---|---|---|---|---|---|---|---|---|---|---|
| $c_{13}$ | $c_{13}$ | $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ |
| | $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ | $c_{13}$ |
| $c_{24}$ | $c_{23}$ | $c_{22}$ | $c_{21}$ | $c_{20}$ | $c_{19}$ | $c_{18}$ | $c_{17}$ | $c_{16}$ | $c_{15}$ | $c_{14}$ | | |
| | $c_{13}$ | $c_{13}$ | $c_{13}$ | $c_{13}$ | $c_{13}$ | $c_{13}$ | $c_{13}$ | $c_{13}$ | $c_{13}$ | | | |

FIG. 18

| | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ | $c_{21}$ | $c_{22}$ | $c_{23}$ | $c_{24}$ |
|---|---|---|---|---|---|---|---|---|---|---|---|---|---|---|---|---|---|---|---|---|---|---|---|---|---|
| $b_0$ | 1 | 0 | 0 | 0 | 0 | 0 | 0 | 0 | 0 | 0 | 0 | 0 | 0 | 1 | 1 | 0 | 0 | 0 | 0 | 0 | 0 | 0 | 1 | 1 | 0 |
| $b_1$ | 0 | 1 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 |
| $b_2$ | 0 | 0 | 1 | 0 | 0 | 0 | 0 | 0 | 0 | 0 | 0 | 0 | 0 | 1 | 1 | 1 | 1 | 0 | 0 | 0 | 0 | 0 | 0 | 0 | 0 |
| $b_3$ | 0 | 0 | 0 | 1 | 0 | 0 | 0 | 0 | 0 | 0 | 0 | 0 | 0 | 1 | 0 | 1 | 1 | 1 | 0 | 0 | 0 | 0 | 0 | 1 | 0 |
| $b_4$ | 0 | 0 | 0 | 0 | 1 | 0 | 0 | 0 | 0 | 0 | 0 | 0 | 0 | 1 | 0 | 0 | 1 | 1 | 1 | 0 | 0 | 0 | 0 | 0 | 0 |
| $b_5$ | 0 | 0 | 0 | 0 | 0 | 1 | 0 | 0 | 0 | 0 | 0 | 0 | 0 | 1 | 0 | 0 | 0 | 1 | 1 | 1 | 0 | 0 | 0 | 0 | 0 |
| $b_6$ | 0 | 0 | 0 | 0 | 0 | 0 | 1 | 0 | 0 | 0 | 0 | 0 | 0 | 1 | 0 | 0 | 0 | 0 | 1 | 1 | 1 | 0 | 0 | 0 | 0 |
| $b_7$ | 0 | 0 | 0 | 0 | 0 | 0 | 0 | 1 | 0 | 0 | 0 | 0 | 0 | 1 | 0 | 0 | 0 | 0 | 0 | 1 | 1 | 1 | 0 | 0 | 0 |
| $b_8$ | 0 | 0 | 0 | 0 | 0 | 0 | 0 | 0 | 1 | 0 | 0 | 0 | 0 | 1 | 0 | 0 | 0 | 0 | 0 | 0 | 1 | 1 | 1 | 0 | 0 |
| $b_9$ | 0 | 0 | 0 | 0 | 0 | 0 | 0 | 0 | 0 | 1 | 0 | 0 | 0 | 1 | 0 | 0 | 0 | 0 | 0 | 0 | 0 | 1 | 1 | 1 | 0 |
| $b_{10}$ | 0 | 0 | 0 | 0 | 0 | 0 | 0 | 0 | 0 | 0 | 1 | 1 | 0 | 1 | 0 | 0 | 0 | 0 | 0 | 0 | 0 | 0 | 1 | 1 | 1 |
| $b_{11}$ | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 1 | 1 |
| $b_{12}$ | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 1 |

UNIVERSAL GALOIS FIELD MULTIPLIER

FIELD OF THE INVENTION

The present invention relates to a scheme for arithmetic operations in finite fields generally and, more particularly, to a method and/or apparatus for implementing a universal Galois field multiplier.

BACKGROUND OF THE INVENTION

An error correction code is a technique for expressing a sequence of numbers such that any errors which are introduced may be detected and corrected (within certain limitations) based on the remaining numbers. The study of error correction codes and the associated mathematics is known as coding theory. The commonly used error correction codes in digital communications and data storage include BCH (Bose-Chaudhuri-Hochquenghem) codes, Reed-Solomon (RS) codes (which are a subset of BCH codes), turbo codes, and the like.

Error correction codes are often defined in terms of Galois or finite field arithmetic. A Galois field is commonly identified by the number of elements which the field contains. The elements of a Galois field may be represented as polynomials in a particular primitive field element, with coefficients in the prime subfield. Since the number of elements contained in a Galois field is always equal to a prime number, q, raised to a positive integer power, m, the notation $GF(q^m)$ is commonly used to refer to the finite field containing $q^m$ elements. In such a field, all operations between elements comprising the field yield results which are each elements of the field.

Finite fields of characteristic 2 are important because these fields have data structures suitable for computers and may be utilized in error correction coding and cryptography. Conventionally, inverse calculation over a finite field with characteristic 2 may require an enormous amount of calculations compared with multiplication. For example, a well-known method for calculating inverses in a finite field follows directly from the cyclic structure of such a field that the inverse of a field element may be obtained directly from exponentiation. To be more precise: $a^{-1} = a^{-2+2^n}$. A person skilled in the art will recognize that this operation may be accomplished with 2n−3 multiplications. Logic circuits for inverse operation based on such a method may thus have large depth and complexity. The depth of a logic circuit is the maximal number of logic elements in a path from a circuit input to a circuit output. The depth may determine the delay of the circuit. The complexity of a logic circuit is the number of logic elements in the circuit. The logic elements may have two inputs and one output.

It would be desirable to provide a method for constructing logic circuits of small depth and complexity for operation of inversion in finite fields of characteristic 2.

SUMMARY OF THE INVENTION

The present invention concerns an apparatus including a multiplier circuit and a multiplexing circuit. The multiplier circuit may be configured to multiply a first multiplicand and a second multiplicand based on a programmable base value and generate a plurality of intermediate values, each intermediate value representing a result of the multiplication reduced by a respective irreducible polynomial. The multiplexing circuit may be configured to generate an output in response to the plurality of intermediate values received from the multiplier circuit and the programmable base value.

The objects, features and advantages of the present invention include providing a method and/or apparatus for implementing a universal Galois field multiplier that may perform multiplication in any field $GF(2^n)$, n=8, . . . , 16, in standard polynomial bases and/or normal bases.

BRIEF DESCRIPTION OF THE DRAWINGS

These and other objects, features and advantages of the present invention will be apparent from the following detailed description and the appended claims and drawings in which:

FIG. 6 is a diagram illustrating an example vector-column C over GF(2) used by the submodules of FIG. 5;

FIG. 7 is a diagram illustrating an example transform matrix $L_i$ over GF(2) used by the submodules of FIG. 5;

FIG. 8 is a diagram illustrating an example vector-column C over GF(2) of the linear transform module of FIG. 5;

FIG. 12 is a diagram illustrating still another step in the computation of the matrix $L_i$ for i=5;

FIG. 13 is a diagram illustrating a final step in the computation of the matrix $L_i$ for i=5;

FIG. 14 is a diagram illustrating the matrix $L_5$ corresponding to the steps illustrated in FIGS. 10-13;

FIG. 15 is a diagram illustrating cover of the matrix $L_5$ by unit submatrices;

FIGS. 16-18 are diagrams illustrating calculations corresponding to an alternative irreducible polynomial to the one associated to FIGS. 10-14;

FIG. 19 is a diagram illustrating the matrix $L_5$ corresponding to the steps illustrated in FIGS. 16-18;

FIG. 20 is a diagram illustrating cover of the matrix $L_5$ of FIG. 19 by unit submatrices;

DETAILED DESCRIPTION OF THE PREFERRED EMBODIMENTS

Figure 1:
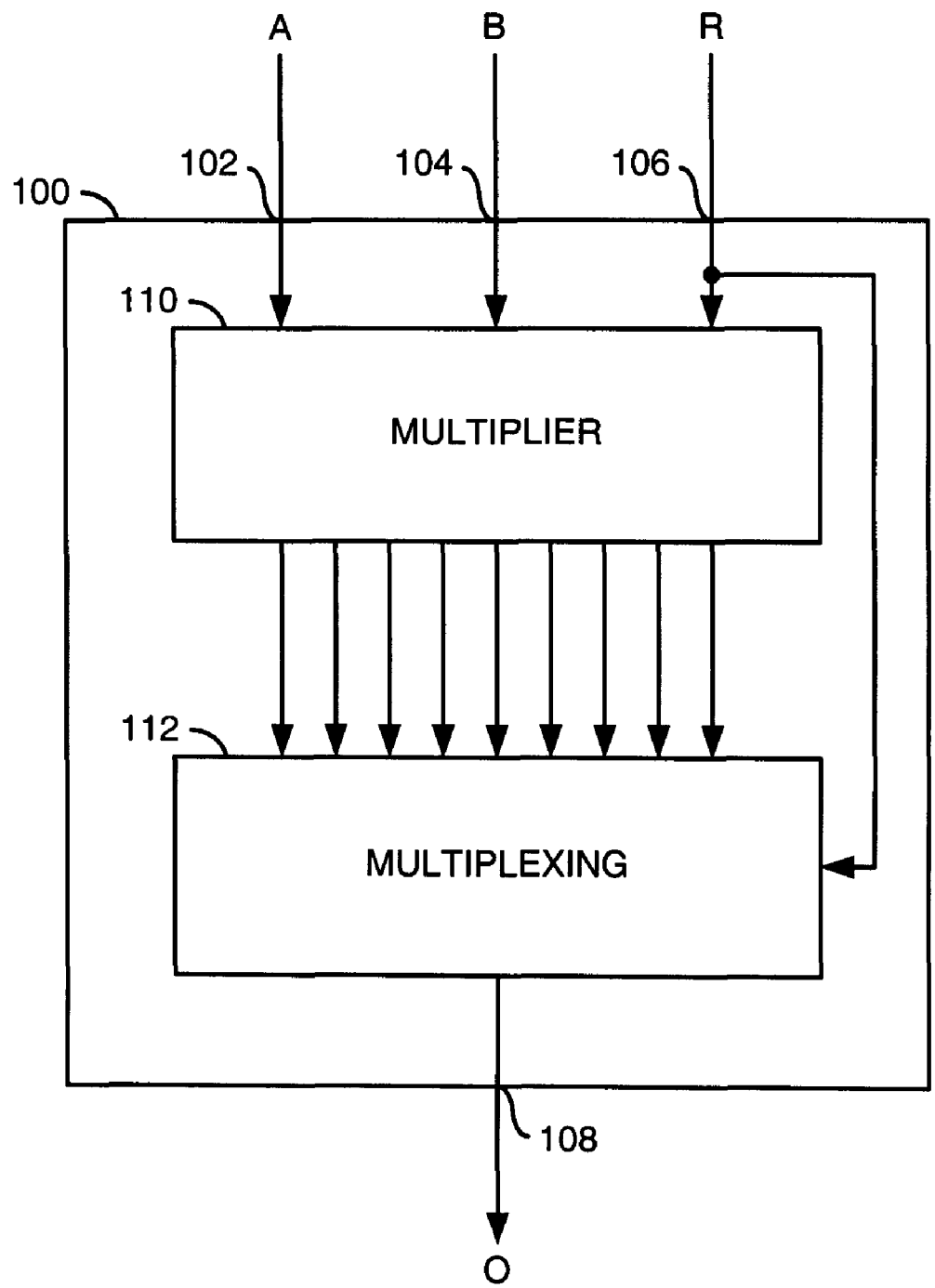
FIG. 1 is a block diagram of a module 100 illustrating a universal Galois field multiplier in accordance with an embodiment of the present invention.

Referring to FIG. 1, a block diagram of a module 100 is shown illustrating a universal Galois field multiplier in accordance with an embodiment of the present invention. The module 100 may perform multiplication in any field GF ($2^n$), n=8, ..., 16, in standard polynomial bases or normal bases. The module 100 may have an input 102 that may receive a first multiplicand signal (e.g., A), an input 104 that may receive a second multiplicand (e.g., B), an input 106 that may receive a programmable base value (e.g., R) and an output 108 that may present a result of the multiplication (e.g., O). In one example, the multiplicand A may comprise a plurality of values (e.g., $a_0, \ldots, a_{15}$), the multiplicand B may comprise a plurality of values (e.g., $b_0, \ldots, b_{15}$), the programmable base value R may comprise a plurality of values (e.g., $R_0, R_1, R_2, R_3$) and the result O may comprise a plurality of values (e.g., $o_0, \ldots, o_{15}$). The signals $R_0, R_1, R_2$, and $R_3$ generally determine a dimension n of the field (e.g., $n=8+8R_0+4R_1+2R_2+R_3$).

The module 100 may comprise a block (or circuit) 110 and a block (or circuit) 112. The block 110 may comprise a multiplier circuit. the block 112 may comprise a multiplexing circuit. The block 110 may have a number of inputs that may receive the signals A, B and R and a number of outputs that may present a number of intermediate values (or results). The block 112 may have a number of inputs that may receive the intermediate values from the block 110 and the signal R. The block 112 may be configured to generate the signal O in response to the intermediate values from the block 110 and the signal R.

Figure 2:
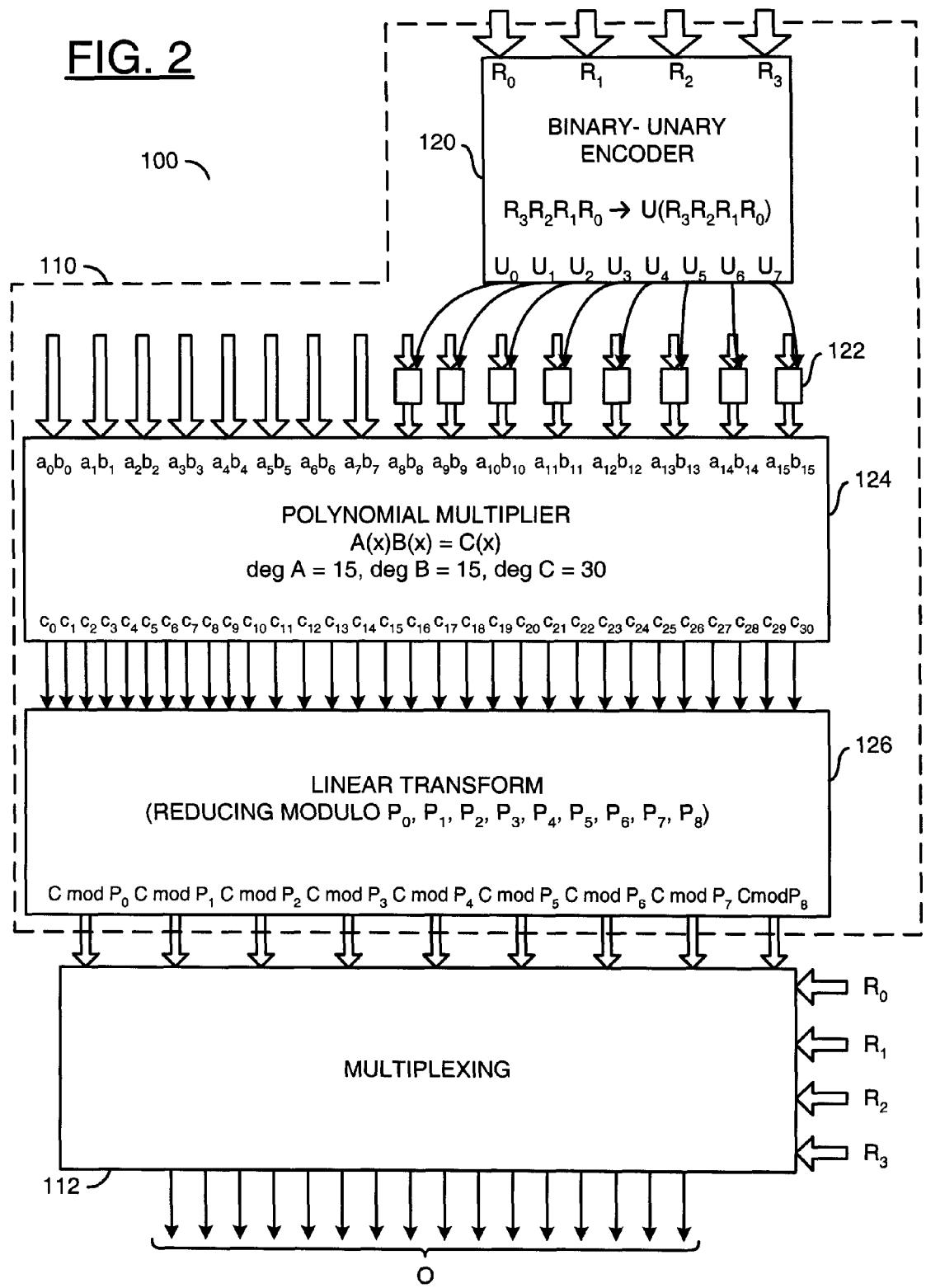
FIG. 2 is a diagram illustrating an example implementation of multiplier circuit of FIG. 1 configured as a standard base multiplier.

Referring to FIG. 2, a diagram is shown illustrating the module 100 configured as a standard base Galois field multiplier in accordance with an embodiment of the present invention. In one example, the block 110 may comprise a block 120, a number of block 122, a block 124 and a block 126. The block 120 may comprises a binary-unary encoder. The blocks 122 may comprise double conjunction circuits. The block 124 may comprise a polynomial multiplier. In one example, the block 124 may be configured to obtain a result C(x) by multiplying a first multiplicand A(x) and a second multiplicand B(x). In one example, the multiplicands may be of degree 15 and the result may be of degree 30. The block 126 may comprise a linear transform block. In one example, the block 126 may be configured to generate a number of intermediate values by reducing the result C(x) from the block 124 using a number of irreducible polynomials (e.g. C mod $P_0$, C mod $P_1$, C mod $P_2$, C mod $P_3$, C mod $P_4$, C mod $P_5$, C mod $P_6$, C mod $P_7$, C mod $P_8$).

With the module 100 configured as a standard base multiplier and appropriate values of the input signals $R_0, R_1, R_2, R_3$, any elements of GF($2^n$) may be represented as vectors (e.g., $(a_0, \ldots, a_{n-1}), (b_0, \ldots, b_{n-1})$). The result of multiplication also may be represented as a vector (e.g., $(c_0, \ldots, c_{n-1})$). In standard base, the vectors $(a_0, \ldots, a_{n-1}), (b_0, \ldots, b_{n-1})$ may be represented as the vector of coefficients of polynomials:

$$A(x)=a_0+\ldots+a_{n-1}x^{n-1}, B(x)=b_0+\ldots+b_{n-1}x^{n-1}$$

Multiplication of these elements may be performed by the multiplication of the corresponding polynomials A(x), B(x) modulo $P_{n-8}(x)$, where $P_{n-8}(x)$ is an irreducible polynomial. The particular irreducible polynomial $P_{n-8}(x)$ generally corresponds to the given standard base in GF($2^n$)).

In one example, the irreducible polynomials $P_{n-8}(x)$ corresponding to the standard bases may be as follows:

$$P_0=x^8+x^4+x^3+x+1,$$

$$P_1=x^9+x+1,$$

$$P_3=x^{11}+X^2+1,$$

$$P_4=x^{12}+x^3+1,$$

$$P_5=x^{13}+x^4+x^3+x+1,$$

$$P=x^{14}+x^5+1,$$

$$P_7=x^{15}+x+1,$$

$$P=x^{16}+x^5+x^3+x+1.$$

Various circuits (e.g., simple and optimized) are presented herein for implementing a universal standard base multiplier in accordance with the present invention. In one example, a simple circuit may contain 482 AND(OR) cells and less than 478 XOR cells. The depth (delay) of the example simple circuit may be determined as $7D_{XOR}+10D_{AND}$. In one example, an optimized circuit may contain 431 AND(OR) cells and less than 447 XOR cells. The depth of the optimized circuit may be determined as $9D_{XOR}+10D_{AND}$.

An example of a universal normal base multiplier approximately double the size and the depth (e.g., $13D_{XOR}+11D_{AND}$) is also presented (described below in connection with FIGS. 23 and 24). A normal base in GF($2^n$), n=8, ..., 16, is a linearly independent system $B^\alpha=\{\alpha, \alpha^2, \alpha^4, \alpha^8, \ldots, \alpha^{2^{(n-1)}}\}$, where $\alpha$ is a root of an irreducible polynomial $P_{n-8}(x)$. Then the system $B_\alpha=\{1, \alpha, \alpha^2, \alpha^3, \ldots, \alpha^{n-1}\}$ is the standard base corresponding to the normal base $B^\alpha$. Also presented is an example when the irreducible polynomials of the bases are $P_0=x^8+x^7+x^2+x+1$ (e.g., corresponding to a unique normal base in GF($2^8$)), $P_1=x^9+x^8+x^6+x^5+x^4+x+1$ (e.g., corresponding to the optimal normal base of type 2), $P_2=x^{10}+x^9+x^8+x^7+x^6+x^5+x^4+x^3+x^2+x+1$ (e.g., corresponding to the optimal normal base of type 1), $P_3=x^{11}+x^{10}+x^8+x^4+x^3+x^2+1$ (e.g., corresponding to the optimal normal base of type 2), $P_4=x^{12}+x^{11}+x^{10}+x^9+x^8+x^7+x^6+x^5+x^4+x^3+x^2+x+1$ (e.g., corresponding to the optimal normal base of type 1), $P_5=x^{13}+x^{12}+x^{10}+x^7+x^4+x^3+1$ (e.g., corresponding to the normal base with minimal complexity, but a better normal base may be obtained with polynomial $x^{13}+x^{12}+x^{11}+x^{10}+x^9+x^8+x^7+x^6+x^5+x^4+x^3+x^2+1$), $P_6=x^{14}+x^{13}+x^{12}+x^9+x^8+x+1$ (e.g., corresponding to the optimal normal base of type 2), $P_7=x^{15}+x^{14}+x^{12}+x^9+x^7+x^5+x^4+x^2+1$ (e.g., corresponding to the normal base with minimal complexity), $P_8=x^{16}+x^{15}+x^{14}+x^5+1$ (e.g., corresponding to a random base).

The module 124 may be implemented using conventional techniques. The module 124 may comprise, in one example, 256 AND cells and 225 XOR cells. The depth of the module 124 may be determined as $4D_{XOR}+D_{AND}$. The size of the module 124 may be reduced as follows (e.g., application of Karatsuba's method). The polynomials A(x) and B(x) may be represented as $$A(x)=A_0(x)+A_1(x)x^8, B(x)=B_0(x)+B_1(x)x^8,$$

then $$C(x)=A(x)B(x)=(A_0(x)+A_1(x)x^8)(B_0(x)+B_1(x)x^8)=A_0(x)B_0(x)+((A_0(x)+A_1(x)))(B_0(x)+B_1(x))-A_0(x)B_0(x)-A_1(x)B_1(x))x^8+A_1(x)B_1(x))x^{16}.$$

A module implementing a 16-bit polynomial multiplier using Karatsuba's method may be constructed from three 8-bit polynomial multiplier modules and 8+8+15+15+7+7=60 XOR cells. The size of Karatsuba's module is 60XOR+3(64AND+49XOR)=192AND+207XOR. The depth of the module is $6D_{XOR}+D_{AND}$.

In one example, binary-unary coding may be performed as summarized in the following coding table TABLE 1:

TABLE 1

| $R_3, R_2, R_1, R_0$ | $U_0, U_1, U_2, U_3, U_4, U_5, U_6, U_7$ |
|---|---|
| 0, 0, 0, 0 | 0, 0, 0, 0, 0, 0, 0, 0 |
| 0, 0, 0, 1 | 1, 0, 0, 0, 0, 0, 0, 0 |
| 0, 0, 1, 0 | 1, 1, 0, 0, 0, 0, 0, 0 |
| 0, 0, 1, 1 | 1, 1, 1, 0, 0, 0, 0, 0 |
| 0, 1, 0, 0 | 1, 1, 1, 1, 0, 0, 0, 0 |
| 0, 1, 0, 1 | 1, 1, 1, 1, 1, 0, 0, 0 |
| 0, 1, 1, 0 | 1, 1, 1, 1, 1, 1, 0, 0 |
| 0, 1, 1, 1 | 1, 1, 1, 1, 1, 1, 1, 0 |
| 1, 0, 0, 0 | 1, 1, 1, 1, 1, 1, 1, 1 |

A multiple-output Boolean function $U(R)=(U_i(R_0,R_1,R_2,R_3))$, $i=0, \ldots, 7$, for TABLE 1 above may be defined as follows:

$U_0 = R_0 \vee R_1 \vee R_2 \vee R_3 = U_1 \vee R_0$, $U_1 = R_1 \vee R_2 \vee R_3 = U_3 \vee R_1$, $U_2 = R_0 \& R_1 \vee R_2 \vee R_3 = U_3 \vee R_0 \& R_1$, $U_3 = R_2 \vee R_3$, $U_4 = (R_0 \vee R_1) \& R_2 \vee R_3 = U_5 \vee R_0 \& R_2$, $U_5 = R_1 \& R_2 \vee R_3$, $U_6 = (R_0 \& R_2) \& R_1 \vee R_3$, $U_7 = R_3$.

Figure 3:
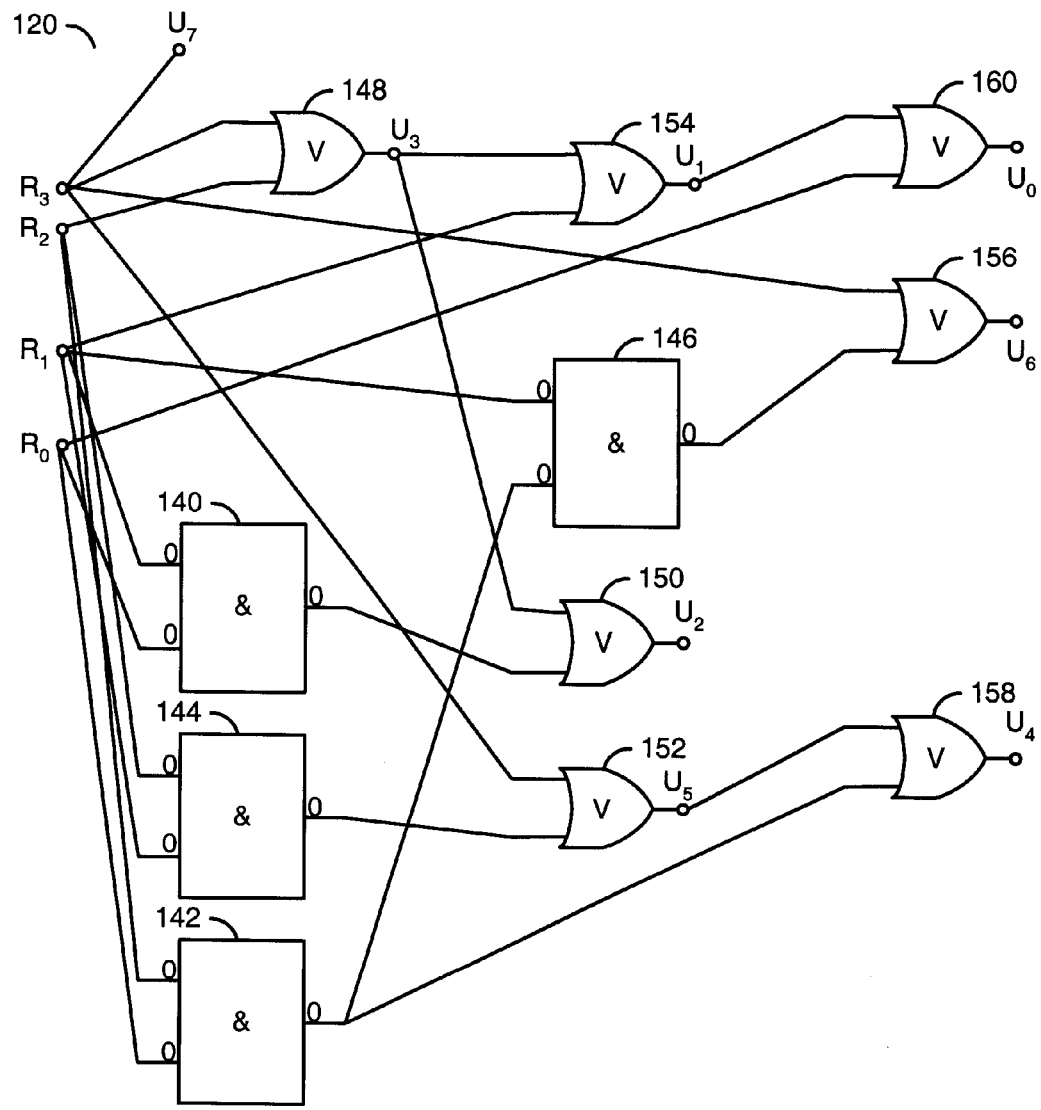
FIG. 3 is a diagram illustrating an example implementation of a binary-unary encoder of FIG. 2.

Referring to FIG. 3, a diagram is shown illustrating an example implementation of the binary-unary encoding module 120 of FIG. 1. The size of the binary-unary encoding (B-U E) module 120 computing the multiple-output Boolean function U(R) as defined above may be equal to 11 and the depth may be equal to 3. In one example, the module 120 may comprise a block (or circuit) 140, a block (or circuit) 142, a block (or circuit) 144, a block (or circuit) 146, a block (or circuit) 148, a block (or circuit) 150, a block (or circuit) 152, a block (or circuit) 154, a block (or circuit) 156, a block (or circuit) 158 and a block (or circuit) 160. The blocks 140-146 may be implemented as two-input AND gates. The blocks 148-160 may be implemented as two-input OR gates.

In one example, the block 140 may have a first input that may receive the signal $R_0$, a second input that may receive the signal $R_1$, and an output. The block 142 may have a first input that may receive the signal $R_0$, a second input that may receive the signal $R_2$, and an output. The block 144 may have a first input that may receive the signal $R_1$, a second input that may receive the signal $R_2$, and an output. The block 146 may have a first input that may receive the signal $R_1$, a second input that may be connected to the output of the block 142, and an output. The block 148 may have a first input that may receive the signal $R_2$, a second input that may receive the signal $R_3$, and an output that may present the signal $U_3$. The block 150 may have a first input that may receive the signal $U_3$, a second input that may be connected to the output of the block 140, and an output that may present the signal $U_2$.

The block 152 may have a first input that may receive the signal $R_3$, a second input that may be connected to the output of the block 144, and an output that may present the signal $U_5$. The block 154 may have a first input that may receive the signal $U_3$, a second input that may receive the signal $R_1$, and an output that may present the signal $U_1$. The block 156 may have a first input that may receive the signal $R_3$, a second input that may be connected to the output of the block 146, and an output that may present the signal $U_6$. The block 158 may have a first input that may receive the signal $U_5$, a second input that may be connected to the output of the block 142, and an output that may present the signal $U_4$. The block 160 may have a first input that may receive the signal $U_1$, a second input that may receive the signal $R_0$, and an output that may present the signal $U_0$.

Figures 4, 5:
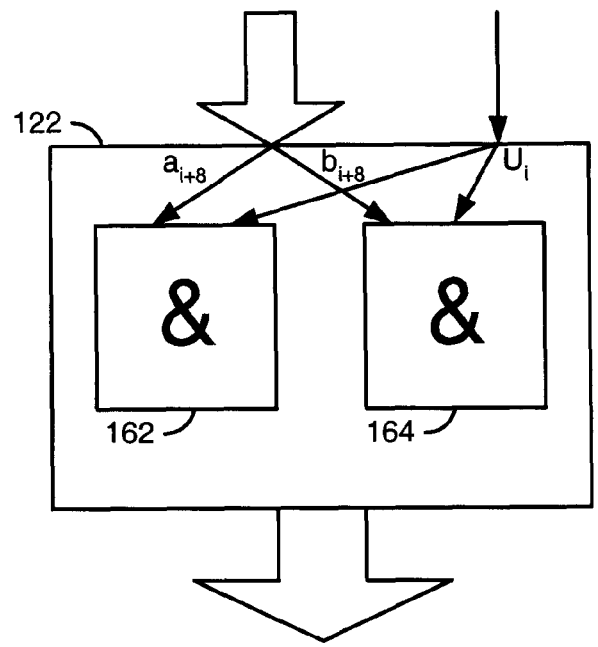
FIG. 4 is a diagram illustrating an example implementation of a double conjunction module of FIG. 2.
FIG. 5 is a diagram illustrating an example implementation of a linear transform module of FIG. 2.

Referring to FIG. 4, a diagram is shown illustrating an example implementation of the blocks 122 of FIG. 2. In one example, the blocks 122 may comprise a block (or circuit) 162 and a block (or circuit) 164. The blocks 162 and 164 may be implemented, in one example, as two-input AND gates. The block 162 may receive a first multiplicand signal (e.g., $a_{i+8}$) at a first input and a signal (e.g., $U_i$) at a second input. The block 164 may receive a second multiplicand signal (e.g., $b_{i+8}$) at a first input and the signal (e.g., $U_i$) at a second input. The blocks 162 and 164 are generally configured to logically AND the signal $U_i$ with the respective multiplicand $a_{i+8}$ or $b_{i+8}$.

Referring to FIG. 5, a diagram is shown illustrating an example implementation of the module 126 of FIG. 2. The module 126 generally computes, in parallel, the result signals $C(x) \bmod P_i(x)$, $i=0, \ldots, 8$, where $P_i$ represents respective irreducible polynomials over field GF(2). In one example, the polynomials $P_i$, $i=0, \ldots, 8$, may be comprised of the following:

$P_0 = x^8 + x^4 + x^3 + x + 1$, $P_1 = x^9 + x + 1$, $P_2 = x^{10} + x^3 + 1$, $P_3 = x^{11} + x^2 + 1$, $P_4 = x^{12} + X^3 + 1$, $P_5 = x^{13} + x^4 + x^3 + x + 1$, $P_6 = x^{14} + x^5 + 1$, $P_7 = x^{15} + x + 1$, $P_8 = x^{16} + x^5 + x^3 + x + 1$.

In one example, the block 126 may comprise a number of blocks (or circuits) 170a-170n. The blocks 170a-170n may be implemented as submodules configured to perform the linear transformation C mod $P_i$. In one example, each of the blocks 170a-170n may be configured to compute the linear transform $C \rightarrow L_i \bullet C$, where C represents a vector-column over GF(2) (e.g., illustrated in FIG. 6) and $L_i$ represents a (8+i, 15+2i)-matrix over GF(2) (e.g., illustrated in FIG. 7).

Figures 9, 10, 11:
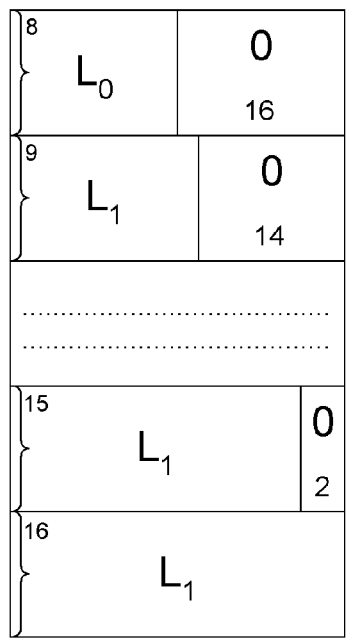
FIG. 9 is a diagram illustrating an example of submatrices of a transform matrix $L_i$ over GF(2) of the linear transform module of FIG. 5.
FIG. 10 is a diagram illustrating a step in the computation of the matrix $L_i$ for i=5.
FIG. 11 is a diagram illustrating another step in the computation of the matrix $L_i$ for i=5.

The block 126 generally computes the overall linear transform $C \rightarrow L \bullet C$, where C is the vector-column over GF(2), illustrated in FIG. 8, and L is a (108,31)-matrix over GF(2) consisting of submatrices $L_i$, $i=0, \ldots, 8$ (illustrated in FIG. 9, where the symbol 0 indicates null-submatrices).

Figures 12, 13:
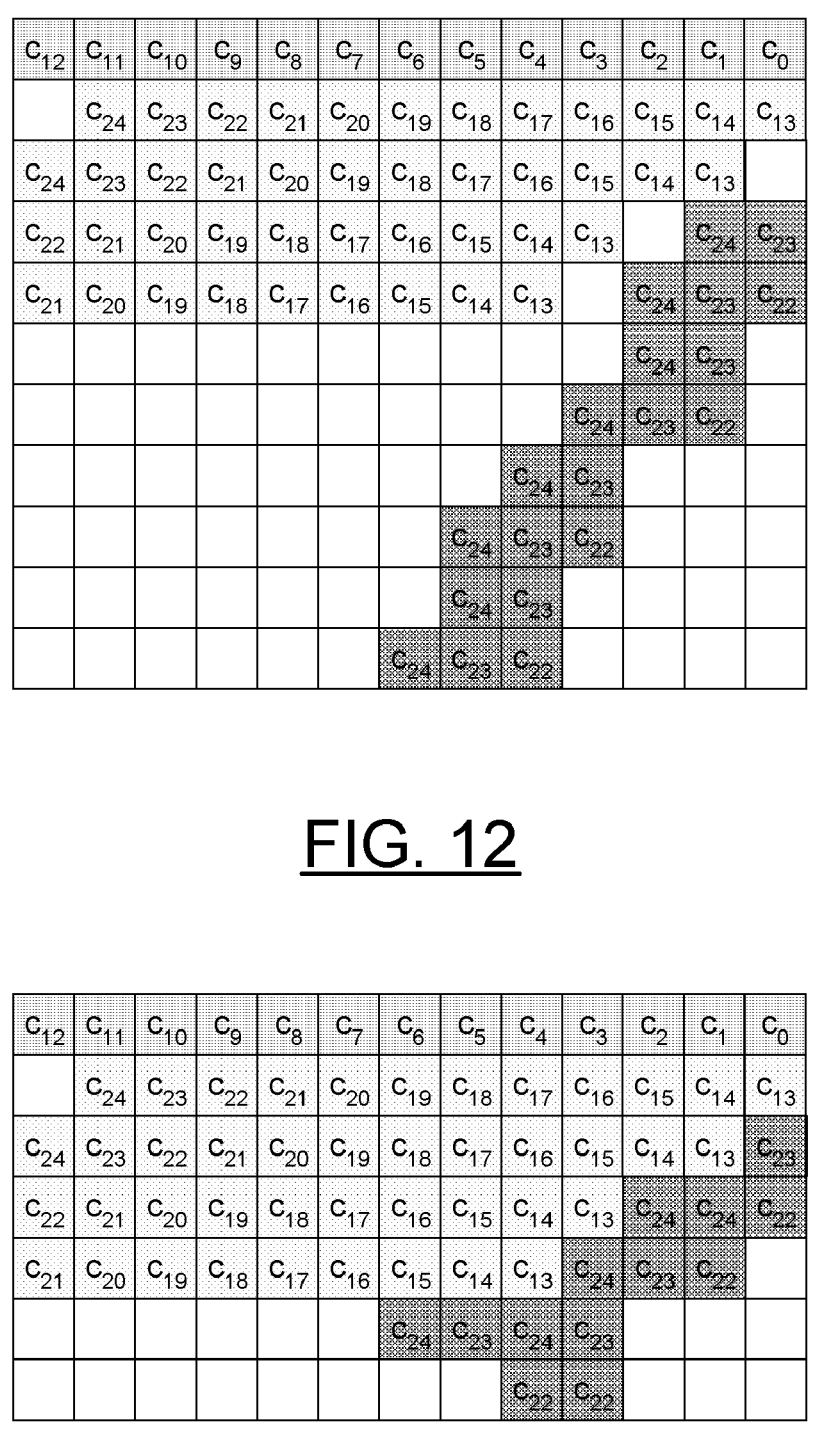

Using as an example i=5, the matrix $L_i$ may be computed as follows. At first, each monomial $c_{13+j} x^{13+j}$ may be replaced on $c_{13+j}(x^{4+j} + x^{3+j} + x^{1+j} + x)$, $j=0, \ldots, 9$ (illustrated in FIG. 10, where each monomial is represented as a cell in a table). In subsequent steps, the manipulations of the first step are repeated (illustrated in FIGS. 11-13). The final result is represented in FIG. 13. The corresponding matrix $L_5$ obtained by the above manipulations is illustrated in FIG. 14.

The following formula represents the linear transform $C(x) \to C(x) \bmod P_5$, $P_5 = x^{13} + x^4 + x^3 + x + 1$, where ai is written instead of $c_i$:

$r := a0 = a13 = a14 = (a1 = a14 = a24 = a13 = a22)x =$
$(a2 = a15 = a14 = a23)x^2 =$
$(a3 = a16 = a15 = a24 = a13 = a23 = a22)x^3 =$
$(a4 = a17 = a16 = a14 = a24 = a13 = a22)x^4 =$
$(a5 = a18 = a17 = a15 = a14 = a23)x^5 =$
$(a6 = a19 = a18 = a16 = a15 = a24)x^6 =$
$(a7 = a20 = a19 = a17 = a16)x^7 =$
$(a8 = a21 = a20 = a18 = a17)x^8 =$
$(a9 = a22 = a21 = a19 = a18)x^9 =$
$(a10 = a23 = 22 = a20 = a19)x^{10} =$
$(a11 = a24 = a23 = a21 = a20)x^{11} =$
$(a12 = a24 = a22 = a21)x^{12}.$

The linear transform may be implemented as a circuit comprising two-input XOR-cells (as illustrated below in connection with FIG. 25). The complexity of such a circuit is equal to 55 and the depth is equal to 3.

Figure 15:
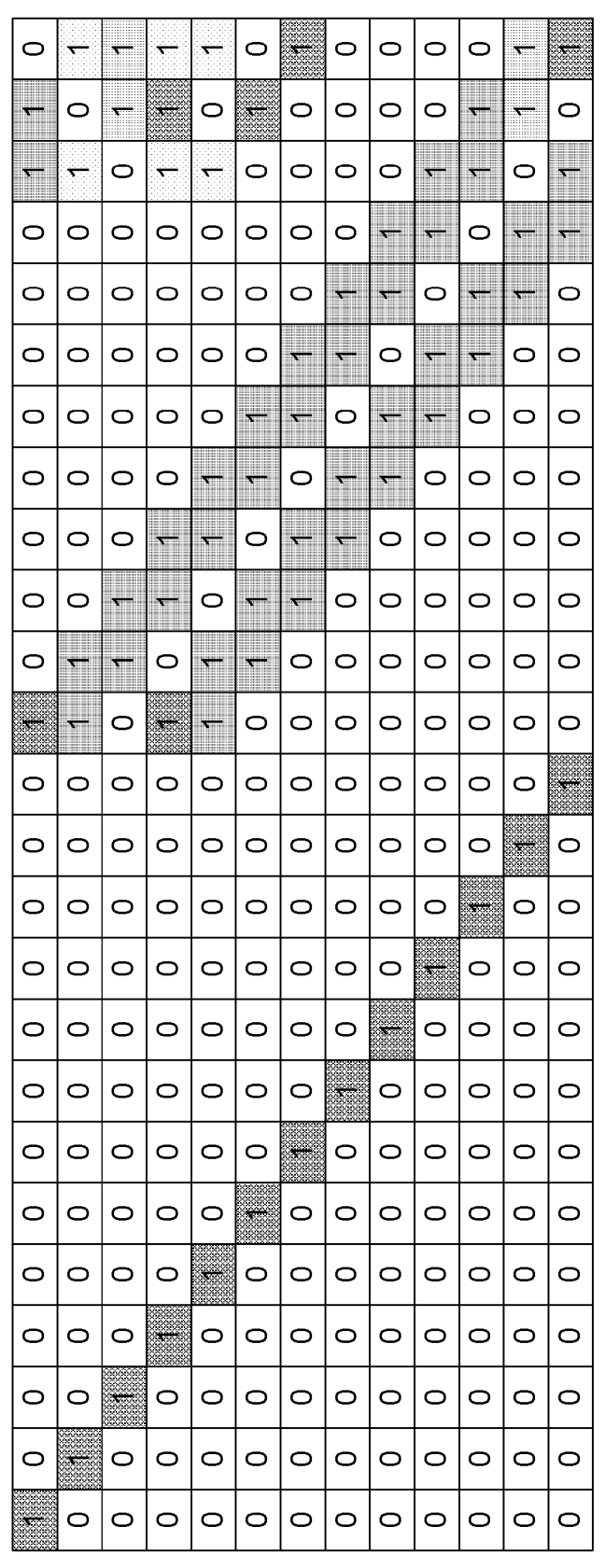

Referring to FIG. 15, a diagram is shown illustrating a cover of the matrix of FIG. 14 by unit-submatrices. A set of unit submatrices (e.g., submatrices with element values of "1") may be used to form the cover for a given matrix if and only if any units of the given matrix belong to only one unit-submatrix from the given set (or cover). The notion of cover is generally used in OR-circuits, but may also be applied as herein with XOR-circuits corresponding to the various tables and figures which will be readily apparent to those skilled in the art(s). The complexity of generating the matrix of FIG. 14 may be minimized by applying the cover of the given matrix by nontrivial units-submatrices (e.g., all cells of a particular unit-submatrix are indicated by similar shading). The complexity of the linear transform performed by the block 126 with such a matrix is equal to 42 and the depth is equal to 3.

In another example, an irreducible polynomial $P_5(x) = f(x) = x^{13} + x^{12} + \ldots + x^2 + 1 = (x^{14} + 1)/(x+1) + x$ may be used instead of $P_5(x) = x^{13} + x^4 + x^3 + x + 1$. The reduction modulo $f(x)$ with the substituted polynomial $P_5(x) = f(x) = x^{13} + x^{12} + \ldots + x^2 + 1 = (x^{14} + 1)/(x+1) + x$ may be computed as follows:

$c_{24}x^{24} + \ldots + c_1 x + c_0 (\bmod f(x)) = (c_{24}x^{24} + \ldots + c_1 x + c_0$
$(\bmod f(x)(x+1)))(\bmod f(x)) = (c_{24}x^{24} + \ldots +$
$c_1 x + c_0 (\bmod x^{14} + x^2 + x + 1)))(\bmod f(x)) =$
$b_{13}x^{13} + \ldots + b_1 x + b_0 (\bmod f(x)) = (b_{12} +$
$b_{13})x^{12} + \ldots + (b_2 + b_{13})x^2 + b_1 x + b_0 + b_{13}.$ The steps of the corresponding calculations are illustrated in FIGS. 16-18. The corresponding matrix $L_5$ is illustrated in FIG. 19. The complexity of a corresponding circuit implemented by a brute force method is equal to 42 and the depth is equal to 3. Minimizing the complexity of the matrix of FIG. 19 with units submatrices is illustrated in FIG. 20.

The following formula represents the linear transform $C(x) \to C(x) \bmod P_5$, $P_5 = x^{13} + x^{12} + \ldots + x^2 + 1$, where ai is written instead of $c_i$:

$r := a0 = a13 = a14 = (a1 = a14 = a24 = a13 = a22)x =$
$(a2 = a15 = a16 = a13 a14)x^2 =$
$(a3 a16 = a17 = a15 = a13)x^3 =$
$(a4 = a17 = a18 = a16 = a13)x^4 =$
$(a5 = a18 = a19 = a17 = a13)x^5 =$
$(a6 = a19 = a20 = a18 = a13)x^6 =$
$(a7 = a20 = a21 = a19 = a13)x^7 =$
$(a8 = a21 = a22 = a20 = a13)x^8 =$
$(a9 = a22 = a23 = a21 = a13)$
$x^9 = a10 = a23 = 24 = a22 = a13 = x^{10} =$
$(a11 = a24 = a25 = a23 = a13)x^{11} =$
$(a12 = a24 = a22 = a13)x^{12}.$

Figure 20:
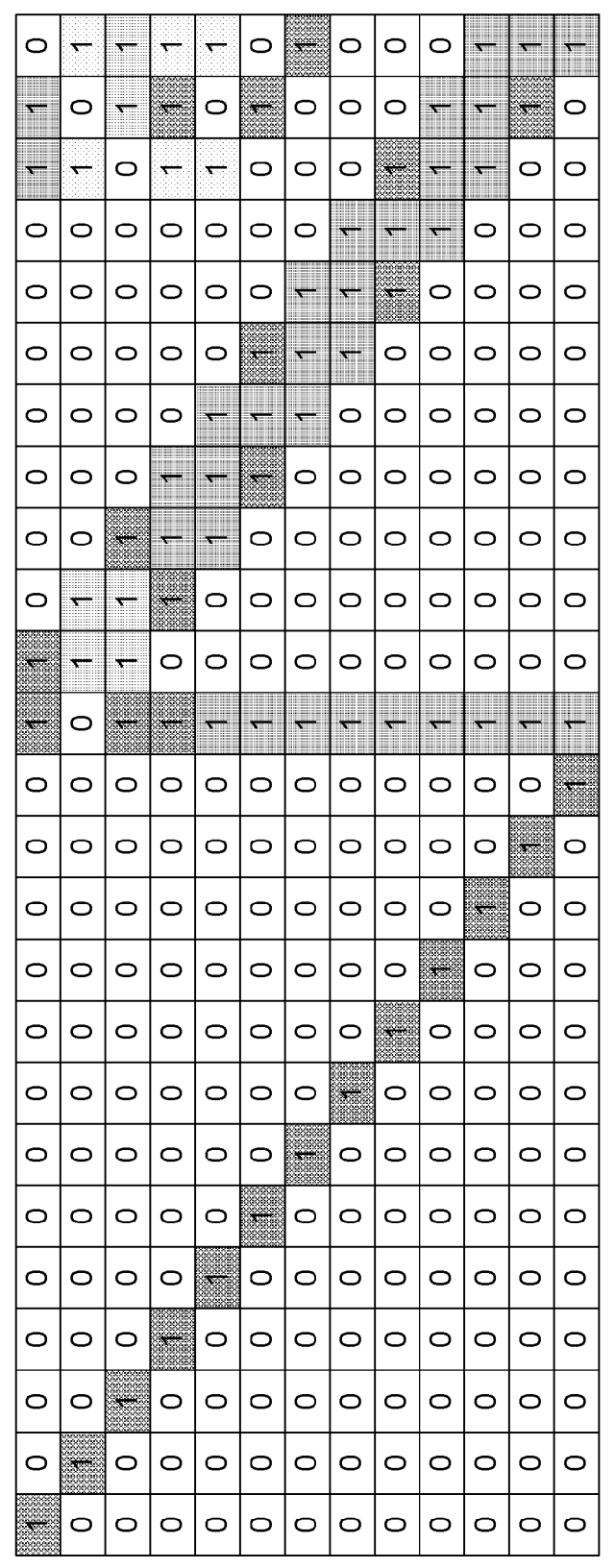

The complexity of the linear transform with the matrix of FIG. 20 is equal to 36. The depth of the linear transform with the matrix of FIG. 20 is equal to 3. However, fan-out of the input $c_{13}$ is equal to 12 (in the case $P_5(x) = x^{13} + x^4 + x^3 + x + 1$ all fanouts are less than 4).

For brevity, examples (similar to the formulas for the case i=5 presented above) are presented below with only the formulas for reducing $C(x) \bmod P_i(x)$, i=0, 1, 2, 3, 4, 6, 7, 8. As was illustrated above for the case i=5, implementation of the linear transform corresponding to each of the matrices below may be optimized by constructing an optimal cover of the set of unit cells by some rectangular all-units submatrices with the indicated number of XOR cells.

For the case i=0, the following formula represents the linear transform $C(x) \to C(x) \bmod P_0$, where ai is written instead of $c_i$:

$r := a0 = a8 = a13 = a12 = (a1 = a9 = a14 = a8 = a12)x =$
$(a2 = a10 = a9 = a13)x^2 =$
$(a3 a11 = a10 = a14 = a8 = a13 = a12)x^3 =$
$(a4 = a11 = a9 = a14 = a8)x^4 = (a5 = a12 = a10 = a9)$
$x^5 = (a6 = a13 = a11 = a10)x^6 = (a7 = a14 = a12 = a11)$
$x^7.$

The corresponding matrix of coefficients is as follows:

| 1 | 0 | 0 | 0 | 0 | 0 | 0 | 1 | 0 | 0 | 0 | 1 | 1 | 0 |
| 0 | 1 | 0 | 0 | 0 | 0 | 0 | 0 | 1 | 0 | 0 | 0 | 1 | 1 |
| 0 | 0 | 1 | 0 | 0 | 0 | 0 | 0 | 0 | 1 | 0 | 0 | 0 | 1 |
| 0 | 0 | 0 | 1 | 0 | 0 | 0 | 1 | 0 | 0 | 1 | 1 | 1 | 0 |
| 0 | 0 | 0 | 0 | 1 | 0 | 0 | 1 | 1 | 0 | 0 | 0 | 0 | 1 |
| 0 | 0 | 0 | 0 | 0 | 1 | 0 | 0 | 1 | 1 | 0 | 0 | 0 | 0 |
| 0 | 0 | 0 | 0 | 0 | 0 | 1 | 0 | 0 | 1 | 1 | 0 | 0 | 0 |
| 0 | 0 | 0 | 0 | 0 | 0 | 0 | 1 | 0 | 0 | 1 | 1 | 0 | 0 |

The depth of the corresponding circuit is equal to 3. The complexity of circuit corresponding is equal to 21.

For the case i=1, the following formula represents the linear transform $C(x) \to C(x) \bmod P_1$, where ai is written instead of $c_i$:

$r := a0 = a9 = (a1 = a10 = a9)x = (a2 = a11 = a10)x^2 =$
$(a3 a12 = a11)x^3 = (a4 = a13 = a12)x^4 =$
$(a5 = a14 = a13)x^5 = (a6 = a15 = a14)x^6 =$
$(a7 = a16 = a15)x^7 = (a8 = a16)x^8.$

The corresponding matrix of coefficients is as follows:

| 1 | 0 | 0 | 0 | 0 | 0 | 0 | 0 | 0 | 1 | 0 | 0 | 0 | 0 | 0 | 0 |
| 0 | 1 | 0 | 0 | 0 | 0 | 0 | 0 | 0 | 1 | 1 | 0 | 0 | 0 | 0 | 0 |
| 0 | 0 | 1 | 0 | 0 | 0 | 0 | 0 | 0 | 0 | 1 | 1 | 0 | 0 | 0 | 0 |
| 0 | 0 | 0 | 1 | 0 | 0 | 0 | 0 | 0 | 0 | 0 | 1 | 1 | 0 | 0 | 0 |
| 0 | 0 | 0 | 0 | 1 | 0 | 0 | 0 | 0 | 0 | 0 | 0 | 1 | 1 | 0 | 0 |
| 0 | 0 | 0 | 0 | 0 | 1 | 0 | 0 | 0 | 0 | 0 | 0 | 0 | 1 | 1 | 0 |
| 0 | 0 | 0 | 0 | 0 | 0 | 1 | 0 | 0 | 0 | 0 | 0 | 0 | 0 | 1 | 1 |
| 0 | 0 | 0 | 0 | 0 | 0 | 0 | 1 | 0 | 0 | 0 | 0 | 0 | 0 | 0 | 1 |
| 0 | 0 | 0 | 0 | 0 | 0 | 0 | 0 | 1 | 0 | 0 | 0 | 0 | 0 | 0 | 1 |

The depth of the corresponding circuit is equal to 2. The complexity of the corresponding circuit is 16.

For the case i=2, the following formula represents the linear transform $C(x) \to C(x) \bmod P_2$, where ai is written instead of $c_i$:

$r := a0 = a10 = a17(a1 = a11 = a18)x = (a2 = a12)x^2 =$
$(a3a13 = a10 = a17)x^3 = (a4 = a14 = a11 = a18)x^4 =$
$(a5 = a15 = a12)x^5 = (a6 = a16 = a13)x^6 =$
$(a7 = a17 = a14)x^7 = (a8 = a16)x^8 = (a9 = a16)x^9.$

The corresponding matrix of coefficients is as follows:

```
1 0 0 0 0 0 0 0 0 0 1 0 0 0 0 0 0 1 0
0 1 0 0 0 0 0 0 0 0 0 1 0 0 0 0 0 0 1
0 0 1 0 0 0 0 0 0 0 0 0 1 0 0 0 0 0 0
0 0 0 1 0 0 0 0 0 0 1 0 0 1 0 0 0 1 0
0 0 0 0 1 0 0 0 0 0 0 1 0 0 1 0 0 0 1
0 0 0 0 0 1 0 0 0 0 0 0 1 0 0 1 0 0 0
0 0 0 0 0 0 1 0 0 0 0 0 0 1 0 0 1 0 0
0 0 0 0 0 0 0 1 0 0 0 0 0 0 1 0 0 1 0
0 0 0 0 0 0 0 0 1 0 0 0 0 0 0 1 0 0 1
0 0 0 0 0 0 0 0 0 1 0 0 0 0 0 0 1 0 0
```

The depth of the corresponding circuit is equal 2. The complexity of the corresponding circuit is 20.

In the i=2 case, the irreducible polynomial $P_2 = x^{10} + x^9 + \ldots + x + 1$ may be used instead of $P_2 = x^{10} + x^3 + 1$. Using the irreducible polynomial $P_2 = x^{10} + x^9 + \ldots + x + 1$ results in the formulas having only 28 monomials:

$r := a0 = a10 = a11(a1 = a12 = a10)x = (a2 = a13 = a10)x^2 =$
$(a3a14 = a10)x^3 = (a4 = a15 = a10)x^4 =$
$(a5 = a16 = a10)x^5 = (a6 = a17 = a10)x^6 =$
$(a7 = a18 = a10)x^7 = (a8 = a10)x^8 = (a9 = a10)x^9.$

The corresponding matrix of coefficients is as follows:

```
1 0 0 0 0 0 0 0 0 0 1 1 0 0 0 0 0 0 0
0 1 0 0 0 0 0 0 0 0 1 0 1 0 0 0 0 0 0
0 0 1 0 0 0 0 0 0 0 1 0 0 1 0 0 0 0 0
0 0 0 1 0 0 0 0 0 0 1 0 0 0 1 0 0 0 0
0 0 0 0 1 0 0 0 0 0 1 0 0 0 0 1 0 0 0
0 0 0 0 0 1 0 0 0 0 1 0 0 0 0 0 1 0 0
0 0 0 0 0 0 1 0 0 0 1 0 0 0 0 0 0 1 0
0 0 0 0 0 0 0 1 0 0 1 0 0 0 0 0 0 0 1
0 0 0 0 0 0 0 0 1 0 1 0 0 0 0 0 0 0 0
0 0 0 0 0 0 0 0 0 1 1 0 0 0 0 0 0 0 0
```

The depth of the corresponding circuit is equal 2. The complexity of the corresponding circuit is 18. However, after optimization of the first formula, circuits with the same complexity are generally obtained.

For the case i=3, the following formula represents the linear transform $C(x) \to C(x) \bmod P_3$, where ai is written instead of $c_i$:

$r := a0 = a11 = a20(a1 = a12)x = (a2 = a13 = a11 = a20)x^2 =$
$(a3a14 = a12)x^3 = (a4 = a15 = a13)x^4 =$
$(a5 = a16 = a14)x^5 = (a6 = a17 = a15)x^6 =$
$(a7 = a18 = a16)x^7 = (a8 = a19 = a17)x^8 =$
$(a9 = a20 = a18)x^9 = (a10 = a19)x^{10}.$

The corresponding matrix of coefficients is as follows:

```
1 0 0 0 0 0 0 0 0 0 0 1 0 0 0 0 0 0 0 0 1
0 1 0 0 0 0 0 0 0 0 0 0 1 0 0 0 0 0 0 0 0
0 0 1 0 0 0 0 0 0 0 0 1 0 1 0 0 0 0 0 0 1
0 0 0 1 0 0 0 0 0 0 0 0 1 0 1 0 0 0 0 0 0
0 0 0 0 1 0 0 0 0 0 0 0 0 1 0 1 0 0 0 0 0
0 0 0 0 0 1 0 0 0 0 0 0 0 0 1 0 1 0 0 0 0
0 0 0 0 0 0 1 0 0 0 0 0 0 0 0 1 0 1 0 0 0
0 0 0 0 0 0 0 1 0 0 0 0 0 0 0 0 1 0 1 0 0
0 0 0 0 0 0 0 0 1 0 0 0 0 0 0 0 0 1 0 1 0
0 0 0 0 0 0 0 0 0 1 0 0 0 0 0 0 0 0 1 0 1
0 0 0 0 0 0 0 0 0 0 1 0 0 0 0 0 0 0 0 1 0
```

The depth of the corresponding circuit is equal 2. The complexity of the corresponding circuit is 21.

For the case i=4, the following formula represents the linear transform $C(x) \to C(x) \bmod P_4$, where ai is written instead of $c_i$:

$r := a0 = a12 = a21(a1 = a13 = a22)x = (a2 = a14)x^2 =$
$(a3a15 = a12 = a21)x^3 = (a4 = a16 = a13 = a22)x^4 =$
$(a5 = a17 = a14)x^5 = (a6 = a18 = a15)x^6 =$
$(a7 = a19 = a16)x^7 = (a8 = a20 = a17)x^8 =$
$(a9 = a21 = a18)x^9 = (a10 = a22 = a19)x^{10}(a11 = a20)$
$x^{11}.$

The corresponding matrix of coefficients is as follows:

```
1 0 0 0 0 0 0 0 0 0 0 0 1 0 0 0 0 0 0 0 1 0
0 1 0 0 0 0 0 0 0 0 0 0 0 1 0 0 0 0 0 0 0 1
0 0 1 0 0 0 0 0 0 0 0 0 0 0 1 0 0 0 0 0 0 0
0 0 0 1 0 0 0 0 0 0 0 0 1 0 0 1 0 0 0 0 1 0
0 0 0 0 1 0 0 0 0 0 0 0 0 1 0 0 1 0 0 0 0 1
0 0 0 0 0 1 0 0 0 0 0 0 0 0 1 0 0 1 0 0 0 0
0 0 0 0 0 0 1 0 0 0 0 0 0 0 0 1 0 0 1 0 0 0
0 0 0 0 0 0 0 1 0 0 0 0 0 0 0 0 1 0 0 1 0 0
0 0 0 0 0 0 0 0 1 0 0 0 0 0 0 0 0 1 0 0 1 0
0 0 0 0 0 0 0 0 0 1 0 0 0 0 0 0 0 0 1 0 0 1
0 0 0 0 0 0 0 0 0 0 1 0 0 0 0 0 0 0 0 1 0 0
```

The depth of the corresponding circuit is equal to 2. The complexity of the corresponding circuit is 24.

In the i=4 case, the irreducible polynomial $P_4 = x^{12} + x^{11} + \ldots + x + 1$ may be used instead of $P_4 = x^{12} + x^3 + 1$. When the irreducible polynomial $P_4 = x^{12} + x^{11} + \ldots + x + 1$ is used, the formulas have only 34 monomials:

$r := a0 = a12 = a13(a1 = a14 = a12)x = (a2 = a15 = a12)x^2 =$
$(a3a16 = a12)x^3 = (a4 = a17 = a12)x^4 =$
$(a5 = a18 = a12)x^5 = (a6 = a19 = a12)x^6 =$
$(a7 = a20 = a12)x^7 = (a8 = a21 = a12)x^8 =$
$(a9 = a22 = a12)x^9 = (a10 = a12)x^{10}(a11 = a12)x^{11}.$

The corresponding matrix of coefficients is as follows:

$$
\begin{pmatrix}
1 & 0 & 0 & 0 & 0 & 0 & 0 & 0 & 0 & 0 & 0 & 1 & 1 & 0 & 0 & 0 & 0 & 0 & 0 & 0 & 0 & 0 \\
0 & 1 & 0 & 0 & 0 & 0 & 0 & 0 & 0 & 0 & 0 & 1 & 0 & 1 & 0 & 0 & 0 & 0 & 0 & 0 & 0 & 0 \\
0 & 0 & 1 & 0 & 0 & 0 & 0 & 0 & 0 & 0 & 0 & 1 & 0 & 0 & 1 & 0 & 0 & 0 & 0 & 0 & 0 & 0 \\
0 & 0 & 0 & 1 & 0 & 0 & 0 & 0 & 0 & 0 & 0 & 1 & 0 & 0 & 0 & 1 & 0 & 0 & 0 & 0 & 0 & 0 \\
0 & 0 & 0 & 0 & 1 & 0 & 0 & 0 & 0 & 0 & 0 & 1 & 0 & 0 & 0 & 0 & 1 & 0 & 0 & 0 & 0 & 0 \\
0 & 0 & 0 & 0 & 0 & 1 & 0 & 0 & 0 & 0 & 0 & 1 & 0 & 0 & 0 & 0 & 0 & 1 & 0 & 0 & 0 & 0 \\
0 & 0 & 0 & 0 & 0 & 0 & 1 & 0 & 0 & 0 & 0 & 1 & 0 & 0 & 0 & 0 & 0 & 0 & 1 & 0 & 0 & 0 \\
0 & 0 & 0 & 0 & 0 & 0 & 0 & 1 & 0 & 0 & 0 & 1 & 0 & 0 & 0 & 0 & 0 & 0 & 0 & 1 & 0 & 0 \\
0 & 0 & 0 & 0 & 0 & 0 & 0 & 0 & 1 & 0 & 0 & 1 & 0 & 0 & 1 & 0 & 0 & 0 & 0 & 0 & 1 & 0 \\
0 & 0 & 0 & 0 & 0 & 0 & 0 & 0 & 0 & 1 & 0 & 0 & 1 & 0 & 0 & 0 & 0 & 0 & 0 & 0 & 0 & 1 \\
0 & 0 & 0 & 0 & 0 & 0 & 0 & 0 & 0 & 0 & 1 & 0 & 1 & 0 & 0 & 0 & 0 & 0 & 0 & 0 & 0 & 0 \\
0 & 0 & 0 & 0 & 0 & 0 & 0 & 0 & 0 & 0 & 0 & 1 & 1 & 0 & 0 & 0 & 0 & 0 & 0 & 0 & 0 & 0 \\
\end{pmatrix}
$$

The depth of the corresponding circuit is equal to 2. The complexity of the corresponding circuit is 22. However, after optimization of first formula, circuits with the same complexity may be obtained.

For the case i=6, the following formula represents the linear transform $C(x) \to C(x) \bmod P_6$, where ai is written instead of $c_i$:

$r := a0 = a14 = a23 = (a1 = a15 = a24)x = (a2 = a16 = a25)x^2 = $
$(a3 a17 = a26)x^3 = (a4 = a18)x^4 = $
$(a5 = a19 = a14 = a23)x^5 = (a6 = a20 = a15 = a24)x^6 = $
$(a7 = a21 = a16 = a25)x^7 = (a8 = a22 = a17 = a26)x^8 = $
$(a9 = a23 = a18)x^9 = (a10 = a24 = 19) = x^{10} = $
$(a11 = a25 = a20)x^{11} = (a12 = a26 = a21)x^{12} = $
$(a13 = a22)x^{13}$.

The corresponding matrix of coefficients is as follows:

$$
\begin{pmatrix}
1 & 0 & 0 & 0 & 0 & 0 & 0 & 0 & 0 & 0 & 0 & 0 & 0 & 1 & 0 & 0 & 0 & 0 & 0 & 0 & 0 & 1 & 0 & 0 & 0 \\
0 & 1 & 0 & 0 & 0 & 0 & 0 & 0 & 0 & 0 & 0 & 0 & 0 & 0 & 1 & 0 & 0 & 0 & 0 & 0 & 0 & 0 & 1 & 0 & 0 \\
0 & 0 & 1 & 0 & 0 & 0 & 0 & 0 & 0 & 0 & 0 & 0 & 0 & 0 & 0 & 1 & 0 & 0 & 0 & 0 & 0 & 0 & 0 & 1 & 0 \\
0 & 0 & 0 & 1 & 0 & 0 & 0 & 0 & 0 & 0 & 0 & 0 & 0 & 0 & 0 & 0 & 1 & 0 & 0 & 0 & 0 & 0 & 0 & 0 & 1 \\
0 & 0 & 0 & 0 & 1 & 0 & 0 & 0 & 0 & 0 & 0 & 0 & 0 & 0 & 0 & 0 & 0 & 1 & 0 & 0 & 0 & 0 & 0 & 0 & 0 \\
0 & 0 & 0 & 0 & 0 & 1 & 0 & 0 & 0 & 0 & 0 & 0 & 0 & 0 & 0 & 0 & 0 & 0 & 1 & 0 & 0 & 1 & 0 & 0 & 0 \\
0 & 0 & 0 & 0 & 0 & 0 & 1 & 0 & 0 & 0 & 0 & 0 & 0 & 0 & 0 & 0 & 0 & 0 & 0 & 1 & 0 & 0 & 1 & 0 & 0 \\
0 & 0 & 0 & 0 & 0 & 0 & 0 & 1 & 0 & 0 & 0 & 0 & 0 & 0 & 0 & 0 & 0 & 0 & 0 & 0 & 1 & 0 & 0 & 1 & 0 \\
0 & 0 & 0 & 0 & 0 & 0 & 0 & 0 & 1 & 0 & 0 & 0 & 0 & 0 & 0 & 0 & 0 & 0 & 0 & 0 & 0 & 1 & 0 & 0 & 1 \\
0 & 0 & 0 & 0 & 0 & 0 & 0 & 0 & 0 & 1 & 0 & 0 & 0 & 0 & 0 & 0 & 0 & 0 & 0 & 0 & 0 & 0 & 1 & 0 & 0 \\
0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 1 & 0 \\
0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 1 \\
0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 \\
\end{pmatrix}
$$

The depth of the corresponding circuit is equal to 2. The complexity of the corresponding circuit is 30.

For the case i=7, the following formula represents the linear transform $C(x) \to C(x) \bmod P_7$, where ai is written instead of $c_i$:

$r := a0 = a15 = (a1 = a16 = a15)x = (a2 = a17 = a16)x^2 = $
$(a3 a18 = a17)x^3 = (a4 = a19 = a18)x^4 = $
$(a5 = a20 = a19)x^5 = (a6 = a21 = a20)x^6 = $
$(a7 = a22 = a21)x^7 = (a8 = a23 = a22)x^8 = $
$(a9 = a24 = a23)x^9 = (a10 = a25 = 24) = x^{10} = $
$(a11 = a26 = a25)x^{11} = (a12 = a27 = a26)x^{12} = $
$(a13 = a28 = a27)x^{13} = (a14 = a28)x^{14}$.

The corresponding matrix of coefficients is as follows:

$$
\begin{pmatrix}
1 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 \\
0 & 1 & 0 & 0 & 0 & 0 & 0 & 0 & 0 & 0 & 0 & 0 & 0 & 0 & 0 & 1 & 1 & 0 & 0 & 0 & 0 & 0 & 0 & 0 & 0 & 0 & 0 & 0 & 0 \\
0 & 0 & 1 & 0 & 0 & 0 & 0 & 0 & 0 & 0 & 0 & 0 & 0 & 0 & 0 & 0 & 1 & 1 & 0 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 & 0 & 0 & 0 & 0 & 0 & 1 & 1 & 0 & 0 & 0 & 0 & 0 & 0 & 0 & 0 & 0 & 0 \\
0 & 0 & 0 & 0 & 1 & 0 & 0 & 0 & 0 & 0 & 0 & 0 & 0 & 0 & 0 & 0 & 0 & 0 & 1 & 1 & 0 & 0 & 0 & 0 & 0 & 0 & 0 & 0 & 0 \\
\end{pmatrix}
$$

-continued

```
0 0 0 0 0 1 0 0 0 0 0 0 0 0 0 0 0 0 0 1 1 0 0 0 0 0 0 0 0 0
0 0 0 0 0 0 1 0 0 0 0 0 0 0 0 0 0 0 0 0 1 1 0 0 0 0 0 0 0 0
0 0 0 0 0 0 0 1 0 0 0 0 0 0 0 0 0 0 0 0 0 1 1 0 0 0 0 0 0 0
0 0 0 0 0 0 0 0 1 0 0 0 0 0 0 0 0 0 0 0 0 0 1 1 0 0 0 0 0 0
0 0 0 0 0 0 0 0 0 1 0 0 0 0 0 0 0 0 0 0 0 0 0 1 1 0 0 0 0 0
0 0 0 0 0 0 0 0 0 0 1 0 0 0 0 0 0 0 0 0 0 0 0 0 1 1 0 0 0 0
0 0 0 0 0 0 0 0 0 0 0 1 0 0 0 0 0 0 0 0 0 0 0 0 0 1 1 0 0 0
0 0 0 0 0 0 0 0 0 0 0 0 1 0 0 0 0 0 0 0 0 0 0 0 0 0 1 1 0 0
0 0 0 0 0 0 0 0 0 0 0 0 0 1 0 0 0 0 0 0 0 0 0 0 0 0 0 1 1 0
0 0 0 0 0 0 0 0 0 0 0 0 0 0 1 0 0 0 0 0 0 0 0 0 0 0 0 0 1 1
0 0 0 0 0 0 0 0 0 0 0 0 0 0 0 1 0 0 0 0 0 0 0 0 0 0 0 0 0 1
```

The depth of the corresponding circuit is equal to 2. The complexity of the corresponding circuit is 28.

For the case i=8, the following formula represents the linear transform $C(x) \to C(x) \mod P_8$, where ai is written instead of $c_i$:

$r := a0 = a16 = a29 = a27 =$
$(a1 = a17 = a30 = a28 = a16 = a29 = a27)x = (a2 = a18 = a29 = a17 = a30 = a28)x^2 =$
$(a3 a19 = a30 = a18 = a16 = a27)x^3 =$
$(a4 = a20 = a19 = a17 = a28)x^4 =$
$(a5 = a21 = a20 = a18 = a16 = a27)x^5 =$
$(a6 = a22 = a21 = a19 = a17 = a28)x^6 =$
$(a7 = a23 = a22 = a20 = a18 = a29)x^7 =$
$(a8 = a24 = a23 = a21 = a19 = a30)x^8 =$
$(a9 = a25 = a24 = a22 = a22)x^9 =$
$(a10 = a26 = 25 = a23 = a21) = x^{10} =$
$(a11 = a27 = a26 = a24 = a22)x^{11} =$
$(a12 = a28 = a27 = a25 = a23)x^{12} =$
$(a13 = a29 = a28 = a26 = a24)x^{13} =$
$(a14 = a30 = a29 = a27 = a25)x^{14} =$
$(a15 = a30 = a28 = a26)x^{15}$.

The corresponding matrix of coefficients is as follows:

```
1 0 0 0 0 0 0 0 0 0 0 0 0 0 0 0 1 0 0 0 0 0 0 0 0 0 0 0 1 0 1 0
0 1 0 0 0 0 0 0 0 0 0 0 0 0 0 0 1 1 0 0 0 0 0 0 0 0 0 0 1 1 1 1
0 0 1 0 0 0 0 0 0 0 0 0 0 0 0 0 0 1 1 0 0 0 0 0 0 0 0 0 0 1 1 1
0 0 0 1 0 0 0 0 0 0 0 0 0 0 0 0 1 0 1 1 0 0 0 0 0 0 0 0 1 0 0 1
0 0 0 0 1 0 0 0 0 0 0 0 0 0 0 0 0 1 0 1 1 0 0 0 0 0 0 0 0 1 0 0
0 0 0 0 0 1 0 0 0 0 0 0 0 0 0 0 1 0 1 0 1 1 0 0 0 0 0 1 0 0 0
0 0 0 0 0 0 1 0 0 0 0 0 0 0 0 0 0 1 0 1 0 1 1 0 0 0 0 0 1 0 0
0 0 0 0 0 0 0 1 0 0 0 0 0 0 0 0 0 0 1 0 1 0 1 1 0 0 0 0 0 1 0
0 0 0 0 0 0 0 0 1 0 0 0 0 0 0 0 0 0 0 1 0 1 0 1 1 0 0 0 0 0 1
0 0 0 0 0 0 0 0 0 1 0 0 0 0 0 0 0 0 0 0 1 0 1 0 1 1 0 0 0 0 0
0 0 0 0 0 0 0 0 0 0 1 0 0 0 0 0 0 0 0 0 0 1 0 1 0 1 1 0 0 0 0
0 0 0 0 0 0 0 0 0 0 0 1 0 0 0 0 0 0 0 0 0 0 1 0 1 0 1 1 0 0 0
0 0 0 0 0 0 0 0 0 0 0 0 1 0 0 0 0 0 0 0 0 0 0 1 0 1 0 1 1 0 0
0 0 0 0 0 0 0 0 0 0 0 0 0 1 0 0 0 0 0 0 0 0 0 0 1 0 1 0 1 1 0
0 0 0 0 0 0 0 0 0 0 0 0 0 0 1 0 0 0 0 0 0 0 0 0 0 1 0 1 0 1 1
0 0 0 0 0 0 0 0 0 0 0 0 0 0 0 1 0 0 0 0 0 0 0 0 0 0 1 0 1 0 1
```

The depth of the corresponding circuit is equal to 3. The complexity of the corresponding circuit is 70.

The total complexity of the block 126 implemented based upon the above formulas is less than 268 XOR, and the depth is equal to $3D_{XOR}$. The full (108,31) matrix of linear transform L may be summarized as follows (null elements in the ends of rows are omitted):

```
1 0 0 0 0 0 0 0 1 0 0 0 1 1 0
0 1 0 0 0 0 0 0 0 1 0 0 0 1 1
0 0 1 0 0 0 0 0 0 0 1 0 0 0 1
0 0 0 1 0 0 0 0 1 0 0 1 1 1 0
0 0 0 0 1 0 0 0 1 1 0 0 0 0 1
0 0 0 0 0 1 0 0 0 1 1 0 0 0 0
0 0 0 0 0 0 1 0 0 0 1 1 0 0 0
0 0 0 0 0 0 0 1 0 0 0 1 1 0 0
1 0 0 0 0 0 0 0 0 1 0 0 0 0 0 0
0 1 0 0 0 0 0 0 0 1 1 0 0 0 0 0
0 0 1 0 0 0 0 0 0 0 1 1 0 0 0 0
0 0 0 1 0 0 0 0 0 0 0 1 1 0 0 0
0 0 0 0 1 0 0 0 0 0 0 0 1 1 0 0
0 0 0 0 0 1 0 0 0 0 0 0 0 1 1 0
0 0 0 0 0 0 1 0 0 0 0 0 0 0 1 1 0
0 0 0 0 0 0 0 1 0 0 0 0 0 0 0 1 1
0 0 0 0 0 0 0 0 1 0 0 0 0 0 0 0 1
1 0 0 0 0 0 0 0 0 0 1 1 0 0 0 0 0 0
0 1 0 0 0 0 0 0 0 0 1 0 1 0 0 0 0 0
0 0 1 0 0 0 0 0 0 0 1 0 0 1 0 0 0 0
0 0 0 1 0 0 0 0 0 0 1 0 0 0 1 0 0 0
0 0 0 0 1 0 0 0 0 0 1 0 0 0 0 1 0 0 0
0 0 0 0 0 1 0 0 0 0 1 0 0 0 0 0 1 0 0
0 0 0 0 0 0 1 0 0 0 1 0 0 0 0 0 0 1 0
0 0 0 0 0 0 0 1 0 0 1 0 0 0 0 0 0 0 1
0 0 0 0 0 0 0 0 1 0 1 0 0 0 0 0 0 0 0
0 0 0 0 0 0 0 0 1 1 0 0 0 0 0 0 0 0
1 0 0 0 0 0 0 0 0 0 0 1 0 0 0 0 0 0 0 1
0 1 0 0 0 0 0 0 0 0 0 0 1 0 0 0 0 0 0 0
0 0 1 0 0 0 0 0 0 0 0 0 1 0 1 0 0 0 0 0 1
0 0 0 1 0 0 0 0 0 0 0 0 0 1 0 1 0 0 0 0 0
0 0 0 0 1 0 0 0 0 0 0 0 0 0 1 0 1 0 0 0 0
0 0 0 0 0 1 0 0 0 0 0 0 0 0 0 1 0 1 0 0 0 0
0 0 0 0 0 0 1 0 0 0 0 0 0 0 0 0 1 0 1 0 0 0
0 0 0 0 0 0 0 1 0 0 0 0 0 0 0 0 0 1 0 1 0 0
0 0 0 0 0 0 0 0 1 0 0 0 0 0 0 0 0 0 1 0 1 0
0 0 0 0 0 0 0 0 0 1 0 0 0 0 0 0 0 0 0 1 0 1
0 0 0 0 0 0 0 0 0 0 1 0 0 0 0 0 0 0 0 0 1 0
1 0 0 0 0 0 0 0 0 0 0 0 1 1 0 0 0 0 0 0 0 0
0 1 0 0 0 0 0 0 0 0 0 0 0 1 0 1 0 0 0 0 0 0 0
0 0 1 0 0 0 0 0 0 0 0 0 0 1 0 0 1 0 0 0 0 0 0
0 0 0 1 0 0 0 0 0 0 0 0 1 0 0 0 1 0 0 0 0 0 0
0 0 0 0 1 0 0 0 0 0 0 0 1 0 0 0 0 1 0 0 0 0 0
0 0 0 0 0 1 0 0 0 0 0 0 1 0 0 0 0 0 1 0 0 0 0 0
```

-continued 0 0 0 0 0 0 1 0 0 0 0 0 1 0 0 0 0 0 0 1 0 0 0
0 0 0 0 0 0 0 1 0 0 0 0 1 0 0 0 0 0 0 0 1 0 0
0 0 0 0 0 0 0 0 1 0 0 0 1 0 0 0 0 0 0 0 0 1 0
0 0 0 0 0 0 0 0 0 1 0 0 1 0 0 0 0 0 0 0 0 0 1
0 0 0 0 0 0 0 0 0 0 1 0 1 0 0 0 0 0 0 0 0 0 0
0 0 0 0 0 0 0 0 0 0 0 1 1 0 0 0 0 0 0 0 0 0 0
1 0 0 0 0 0 0 0 0 0 0 0 1 1 0 0 0 0 0 0 0 0 0
0 1 0 0 0 0 0 0 0 0 0 0 0 1 1 0 0 0 0 0 0 0 0
0 0 1 0 0 0 0 0 0 0 0 0 1 1 1 1 0 0 0 0 0 0 0
0 0 0 1 0 0 0 0 0 0 0 0 1 0 1 1 1 0 0 0 0 0 0
0 0 0 0 1 0 0 0 0 0 0 0 1 0 0 1 1 1 0 0 0 0 0
0 0 0 0 0 1 0 0 0 0 0 0 1 0 0 0 1 1 1 0 0 0 0
0 0 0 0 0 0 1 0 0 0 0 0 1 0 0 0 0 1 1 1 0 0 0
0 0 0 0 0 0 0 1 0 0 0 0 1 0 0 0 0 0 1 1 1 0 0
0 0 0 0 0 0 0 0 1 0 0 0 1 0 0 0 0 0 0 1 1 1 0
0 0 0 0 0 0 0 0 0 1 0 0 1 0 0 0 0 0 0 0 1 1 1
0 0 0 0 0 0 0 0 0 0 1 0 1 0 0 0 0 0 0 0 0 1 1
0 0 0 0 0 0 0 0 0 0 0 1 1 0 0 0 0 0 0 0 0 0 1
1 0 0 0 0 0 0 0 0 0 0 0 1 0 0 0 0 0 0 1 0 0 0
0 1 0 0 0 0 0 0 0 0 0 0 0 1 0 0 0 0 0 0 1 0 0
0 0 1 0 0 0 0 0 0 0 0 0 0 0 1 0 0 0 0 0 0 1 0
0 0 0 1 0 0 0 0 0 0 0 0 0 0 0 1 0 0 0 0 0 0 1
0 0 0 0 1 0 0 0 0 0 0 0 0 0 0 0 1 0 0 0 0 0 0
0 0 0 0 0 1 0 0 0 0 0 0 1 0 0 0 1 0 0 0 1 0 0 0
0 0 0 0 0 0 1 0 0 0 0 0 0 1 0 0 0 1 0 0 0 1 0 0
0 0 0 0 0 0 0 1 0 0 0 0 0 0 1 0 0 0 1 0 0 0 1 0
0 0 0 0 0 0 0 0 1 0 0 0 0 0 0 1 0 0 0 1 0 0 0 1
0 0 0 0 0 0 0 0 0 1 0 0 0 0 0 0 1 0 0 0 1 0 0 0
0 0 0 0 0 0 0 0 0 0 1 0 0 0 0 0 0 1 0 0 0 1 0 0
0 0 0 0 0 0 0 0 0 0 0 1 0 0 0 0 0 0 1 0 0 0 1 0
0 0 0 0 0 0 0 0 0 0 0 0 1 0 0 0 0 0 0 1 0 0 0 1
0 0 0 0 0 0 0 0 0 0 0 0 0 1 0 0 0 0 0 0 1 0 0 0
1 0 0 0 0 0 0 0 0 0 0 0 0 1 0 0 0 0 0 0 0 0 0 0
0 1 0 0 0 0 0 0 0 0 0 0 0 1 1 0 0 0 0 0 0 0 0 0
0 0 1 0 0 0 0 0 0 0 0 0 0 0 1 1 0 0 0 0 0 0 0 0
0 0 0 1 0 0 0 0 0 0 0 0 0 0 0 1 1 0 0 0 0 0 0 0
0 0 0 0 1 0 0 0 0 0 0 0 0 0 0 0 1 1 0 0 0 0 0 0
0 0 0 0 0 1 0 0 0 0 0 0 0 0 0 0 0 1 1 0 0 0 0 0
0 0 0 0 0 0 1 0 0 0 0 0 0 0 0 0 0 0 1 1 0 0 0 0
0 0 0 0 0 0 0 1 0 0 0 0 0 0 0 0 0 0 0 1 1 0 0 0
0 0 0 0 0 0 0 0 1 0 0 0 0 0 0 0 0 0 0 0 1 1 0 0
0 0 0 0 0 0 0 0 0 1 0 0 0 0 0 0 0 0 0 0 0 1 1 0
0 0 0 0 0 0 0 0 0 0 1 0 0 0 0 0 0 0 0 0 0 0 1 1 0 0 0

-continued 0 0 0 0 0 0 0 0 0 0 1 0 0 0 0 0 0 0 0 0 0 0 0 0 0 1 1 0 0

0 0 0 0 0 0 0 0 0 0 0 1 0 0 0 0 0 0 0 0 0 0 0 0 0 0 1 1 0

0 0 0 0 0 0 0 0 0 0 0 0 1 0 0 0 0 0 0 0 0 0 0 0 0 0 0 1 1

0 0 0 0 0 0 0 0 0 0 0 0 0 1 0 0 0 0 0 0 0 0 0 0 0 0 0 0 1

1 0 0 0 0 0 0 0 0 0 0 0 0 0 0 1 0 0 0 0 0 0 0 0 0 0 1 0 1 0

0 1 0 0 0 0 0 0 0 0 0 0 0 0 0 1 1 0 0 0 0 0 0 0 0 0 1 1 1 1

0 0 1 0 0 0 0 0 0 0 0 0 0 0 0 1 0 1 1 0 0 0 0 0 0 0 0 1 1 1

0 0 0 1 0 0 0 0 0 0 0 0 0 0 0 1 0 1 1 0 0 0 0 0 0 0 1 0 0 1

0 0 0 0 1 0 0 0 0 0 0 0 0 0 0 1 0 1 1 0 0 0 0 0 0 0 0 1 0 0

0 0 0 0 0 1 0 0 0 0 0 0 0 0 0 1 0 1 0 1 1 0 0 0 0 0 1 0 0 0

0 0 0 0 0 0 1 0 0 0 0 0 0 0 0 1 0 1 0 1 1 0 0 0 0 0 0 1 0 0

0 0 0 0 0 0 0 1 0 0 0 0 0 0 0 0 1 0 1 0 1 1 0 0 0 0 0 0 1 0

0 0 0 0 0 0 0 0 1 0 0 0 0 0 0 0 0 1 0 1 0 1 1 0 0 0 0 0 0 1

0 0 0 0 0 0 0 0 0 1 0 0 0 0 0 0 0 0 1 0 1 0 1 1 0 0 0 0 0 0

0 0 0 0 0 0 0 0 0 0 1 0 0 0 0 0 0 0 0 1 0 1 0 1 1 0 0 0 0 0

0 0 0 0 0 0 0 0 0 0 0 1 0 0 0 0 0 0 0 0 1 0 1 0 1 1 0 0 0

0 0 0 0 0 0 0 0 0 0 0 0 1 0 0 0 0 0 0 0 0 1 0 1 0 1 1 0 0

0 0 0 0 0 0 0 0 0 0 0 0 0 1 0 0 0 0 0 0 0 0 1 0 1 0 1 1 0

0 0 0 0 0 0 0 0 0 0 0 0 0 0 1 0 0 0 0 0 0 0 0 1 0 1 0 1 1

0 0 0 0 0 0 0 0 0 0 0 0 0 0 0 1 0 0 0 0 0 0 0 0 1 0 1 0 1

Implementation of the linear transform corresponding to the above matrix may be optimized by constructing an optimal cover of the set of unit cells by some rectangular all-units submatrices, as will be apparent to those skilled in the art(s). For example, the complexity of the linear transform above may be reduced by approximately 30. As a result, the above linear transform may be implemented by a circuit containing less than 240 XOR cells.

Figure 21:
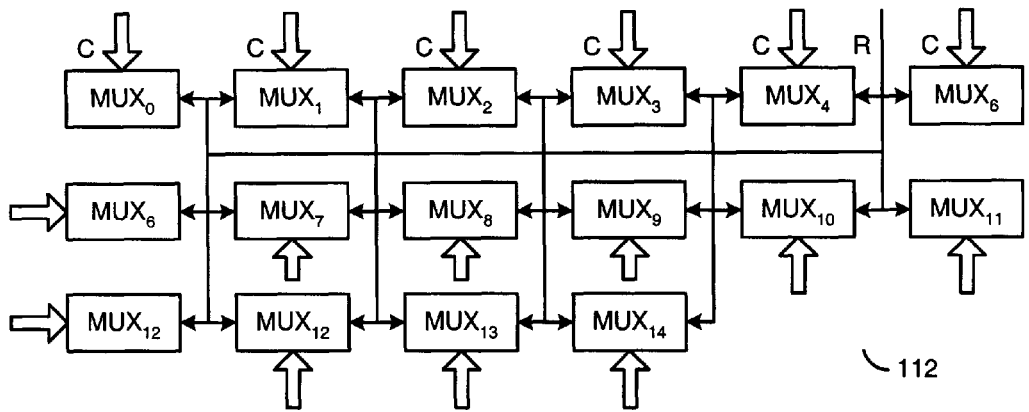
FIG. 21 is a diagram illustrating an example implementation of the multiplexing module of FIG. 1.

Referring to FIG. 21, a diagram is shown illustrating an example implementation of the multiplexing circuit 112 of FIG. 1 in accordance with an embodiment of the present invention. The multiplexing module 112 may be constructed as follows. The outputs of the submodules computing C(x) mod $P_i$ may be designated as $C_{i,j}$, j=0, 1, . . . , 7+i, i=0, 1, . . . , 8. The multiplexing module 112 may include, in one example, 15 multiplexers:

$MUX_j=MUX(C_{0,j},C_{1,j}, \ldots, C_{8,j},R_0,R_1,R_2,R_3)$, j=0, 1, . . . , 7, $MUX_8=MUX(C_{1,8}, \ldots, C_{8,8},R_0,R_1,R_2)$ $MUX_9=MUX(C_{2,9}, \ldots, C_{8,9},R_0,R_1,R_2)$, $MUX_{10}=MUX(C_{3,10}, \ldots, C_{8,10},R_0,R_1,R_2)$, $MUX_{11}=MUX(C_{4,11}, \ldots, C_{8,11},R_0,R_1,R_2)$, $MUX_{12}=MUX(C_{5,12},C_{6,12},C_{7,12},C_{8,12},R_0,R_1)$ $MUX_{13}=MUX(C_{6,13},C_{7,13},C_{8,13},R_0,R_1)$ $MUX_{14}=MUX(C_{7,14},C_{7,14},R_0)$.

The functions of the individual multiplexers may be summarized as in the following TABLES 2-9:

TABLE 2

| $R_3, R_2, R_1, R_0$ | $Mux_i (U_0, U_1, U_2, U_3, U_4, U_5, U_6, U_7, U_8, R_0, R_1, R_2, R_3)$ |
|---|---|
| 0, 0, 0, 0 | $U_0$ |
| 0, 0, 0, 1 | $U_1$ |
| 0, 0, 1, 0 | $U_2$ |
| 0, 0, 1, 1 | $U_3$ |
| 0, 1, 0, 0 | $U_4$ |
| 0, 1, 0, 1 | $U_5$ |
| 0, 1, 1, 0 | $U_6$ |
| 0, 1, 1, 1 | $U_7$ |
| 1, 0, 0, 0 | $U_8$ |

TABLE 3

| $R_2, R_1, R_0$ | $Mux_8 (U_1, U_2, U_3, U_4, U_5, U_6, U_7, U_8, R_0, R_1, R_2)$ |
|---|---|
| 0, 0, 1 | $U_1$ |
| 0, 1, 0 | $U_2$ |
| 0, 1, 1 | $U_3$ |
| 1, 0, 0 | $U_4$ |
| 1, 0, 1 | $U_5$ |
| 1, 1, 0 | $U_6$ |
| 1, 1, 1 | $U_7$ |
| 0, 0, 0 | $U_8$ |

TABLE 4

| $R_2, R_1, R_0$ | $Mux_9 (U_2, U_3, U_4, U_5, U_6, U_7, U_8, R_0, R_1, R_2)$ |
|---|---|
| 0, 1, 0 | $U_2$ |
| 0, 1, 1 | $U_3$ |
| 1, 0, 0 | $U_4$ |
| 1, 0, 1 | $U_5$ |
| 1, 1, 0 | $U_6$ |
| 1, 1, 1 | $U_7$ |
| 0, 0, 0 | $U_8$ |

TABLE 5

| $R_2, R_1, R_0$ | $Mux_{10} (U_3, U_4, U_5, U_6, U_7, U_8, R_0, R_1, R_2)$ |
|---|---|
| 0, 1, 1 | $U_3$ |
| 1, 0, 0 | $U_4$ |
| 1, 0, 1 | $U_5$ |
| 1, 1, 0 | $U_6$ |
| 1, 1, 1 | $U_7$ |
| 0, 0, 0 | $U_8$ |

TABLE 6

| $R_2, R_1, R_0$ | $Mux_{11} (U_4, U_5, U_6, U_7, U_8, R_0, R_1, R_2, R_3)$ |
|---|---|
| 1, 0, 0 | $U_4$ |
| 1, 0, 1 | $U_5$ |
| 1, 1, 0 | $U_6$ |
| 1, 1, 1 | $U_7$ |
| 0, 0, 0 | $U_8$ |

TABLE 7

| $R_1, R_0$ | $Mux_{12} (U_5, U_6, U_7, U_8, R_0, R_1)$ |
|---|---|
| 0, 1 | $U_5$ |
| 1, 0 | $U_6$ |
| 1, 1 | $U_7$ |
| 0, 0 | $U_8$ |

TABLE 8

| $R_1, R_0$ | $Mux_{13} (U_6, U_7, U_8, R_0, R_1)$ |
|---|---|
| 1, 0 | $U_6$ |
| 1, 1 | $U_7$ |
| 0, 0 | $U_8$ |

TABLE 9

| $R_0$ | $Mux_{14} (U_7, U_8, R_0)$ |
|---|---|
| 1 | $U_7$ |
| 0 | $U_8$ |

In general, a standard 2-input multiplexer may comprise three two-input cells and have a depth of 2, a standard 3-input multiplexer may comprise six two-input cells and have a depth of 4, a standard 4-input multiplexer may comprise nine two-input cells and have a depth of 4, a standard 5-input multiplexer may comprise twelve two-input cells and have a depth of 6, a standard 6-input multiplexer may comprise fifteen two-input cells and have a depth of 6, a standard 7-input multiplexer may comprise eighteen two-input cells and have a depth of 6, a standard 8-input multiplexer may comprise twenty-one two-input cells and have a depth 6, and a standard 9-input multiplexer may comprise twenty-four two-input cells and have a depth of 8. Consequently, the size of the multiplexing module 112 is generally less than or equal to 8·24+21+18+15+12+9+6+3=276 AND(OR) and the depth is 8 $D_{AND(OR)}$.

Figure 22:
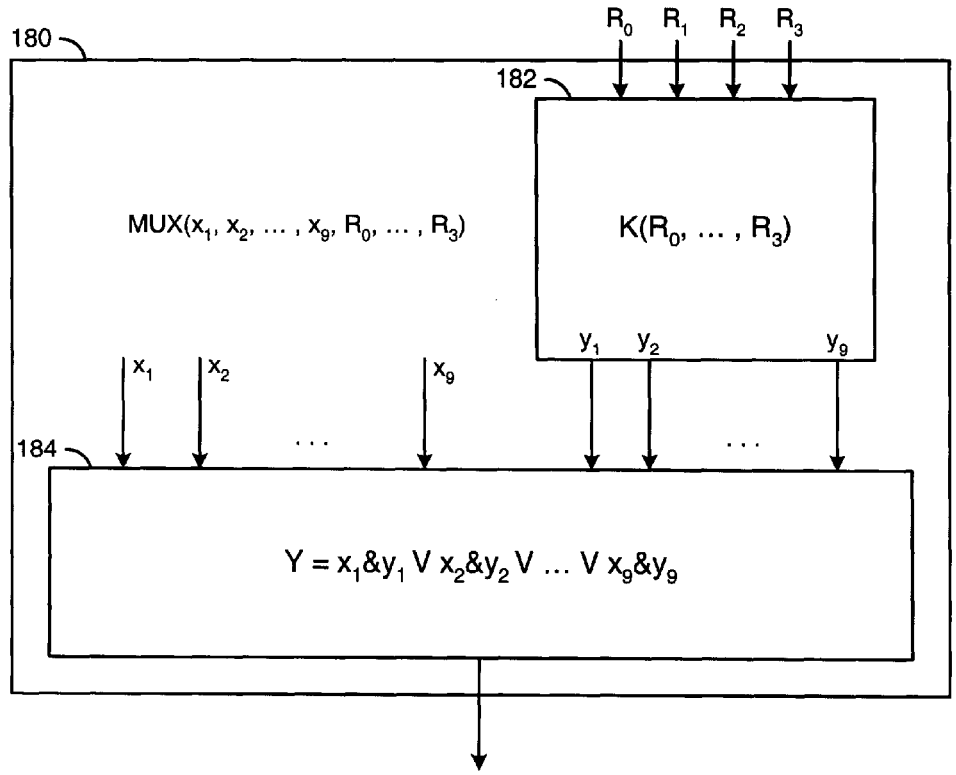
FIG. 22 is a diagram illustrating an example of a 9 to 1 multiplexer in accordance with an embodiment of the present invention.

Referring to FIG. 22, a diagram of a 9 to 1 multiplexing circuit 180 is shown illustrating an alternative embodiment of the multiplexing circuit 112 of FIG. 21. In one example, all of the multiplexers may have joint inputs $R_i$, i=0, 1, 2, 3. Consequently, each of the multiplexers $MUX_i$, i=0, . . . , 14, in FIG. 21 may be implemented using a circuit similar to the multiplexing circuit 180. In one example, the circuit 180 may comprise a block (or circuit) 182 and a block (or circuit) 184. The block 182 may have four inputs that may receive the signals $R_i$, i=0, 1, 2, 3, and thirteen outputs that may present control signals (e.g., $y_i$, i=0, 1, . . . , 12). The block 182 may be configured to implement a function $K(R_0, \ldots, R_3)$ with 4 inputs (e.g., $R_0, \ldots, R_3$) and 13 outputs (e.g., $R_1 \& R_0$, $\rightarrow R_1 \& R_0$, $R_1 \& \rightarrow R_0$, $\rightarrow R_1 \& R_0$, $R_2 \& R_1 \& R_0$, $R_2 \& \rightarrow R_1 \& R_0$, $R_2 \& R_1 \& \rightarrow R_0$, $R_2 \& \rightarrow R_1 \& \rightarrow R_0$, $\rightarrow R_2 \& R_1 \& R_0$, $\rightarrow R_2 \& \rightarrow R_1 \& R_0$, $\rightarrow R_2 \& R_1 \& \rightarrow R_0$, $\rightarrow R_2 \& \rightarrow R_1 \& \rightarrow R_0$, $R_3 \& \rightarrow R_2 \& \rightarrow R_1 \& \rightarrow R_0$, where $\rightarrow$ represents the operation of taking the logical complement). In one example, the block 182 may be constructed from 13 two-input cells with a depth 3. The block 184 may be configured to implement a function $Y = x_1 \& y_1 V \ldots V x_m \& y_m$, where m represents the number of inputs multiplexed (e.g., m=2, 9).

In one example, the multiplexers $MUX_i$, i=0, . . . , 14, in FIG. 21 may be implemented with a common block 182. Consequently, the size of multiplexing module 112 implemented with the multiplexing structure similar to the block 180 is less than or equal to 8·17+15+13+11+9+7+5+3+13=212 AND(OR) and the depth (from inputs $x_i$) is 5 $D_{AND(OR)}$.

Figure 23:
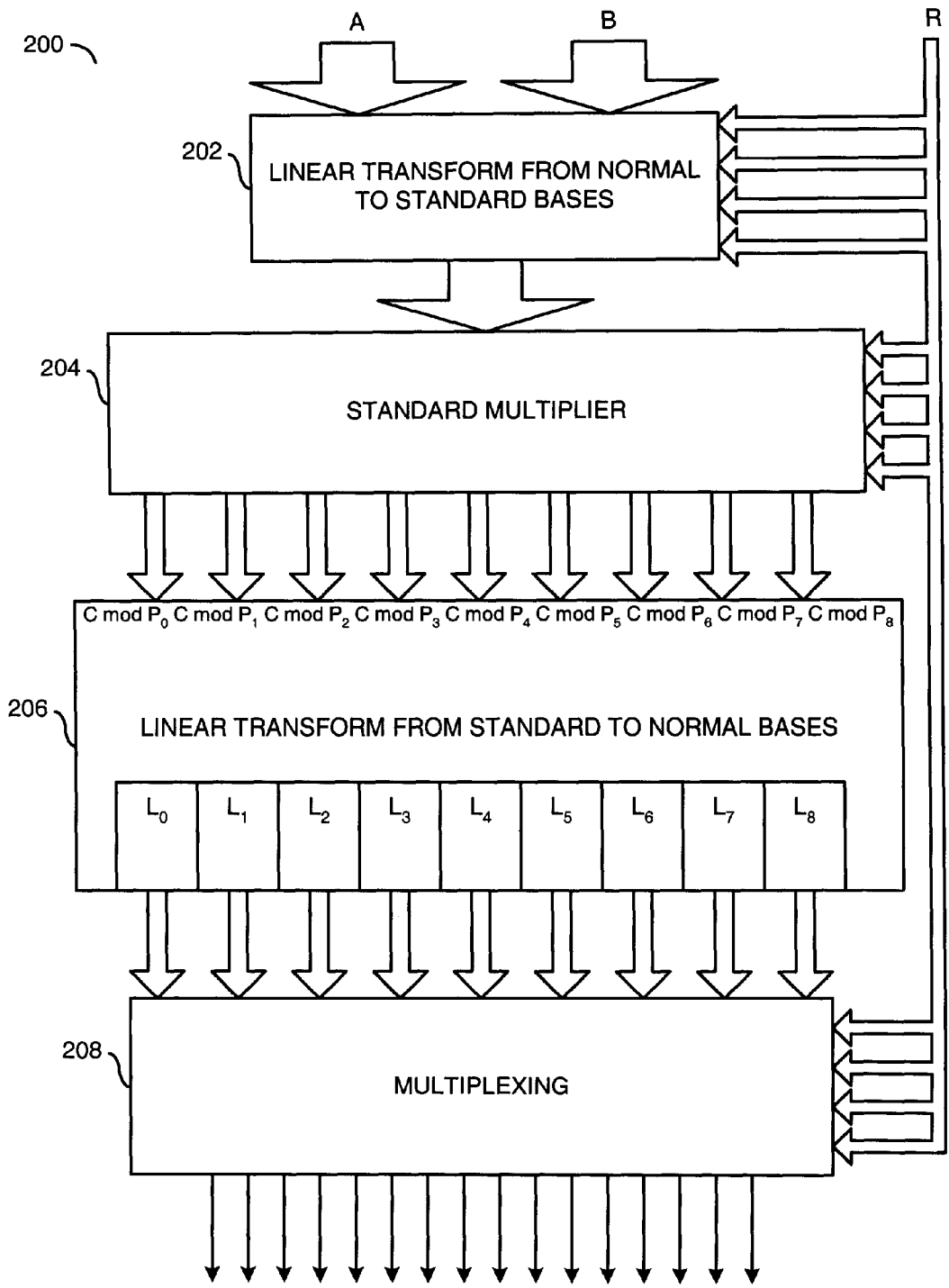
FIG. 23 is a diagram illustrating an example implementation of multiplier circuit of FIG. 1 configured as a normal base multiplier.

Referring to FIG. 23, a diagram of a module 200 is shown illustrating a universal multiplier for normal bases in accordance with an embodiment of the present invention. In one example, the module 200 may comprises a block (or circuit) 202, a block (or circuit) 204, a block (or circuit) 206 and a block (or circuit) 208. The block 202 may be configured to perform a linear transform from a normal base to a standard base. The block 204 may comprise a standard multiplier circuit. In one example, the block 204 may be implemented similarly to the block 110 (described above in connection with FIG. 2). For example, the block 204 may comprise a bibary-unary encoder, a polynomial multiplier and a linear transform block configured to reduce results from the polynomial multiplier modulo $P_i$, i=0, . . . , 8. The block 206 may be configured to perform a linear transform from the normal base to the standard base. The block 208 may comprise a multiplexing circuit. The block 208 may be implemented similarly to the block 112 (described above in connection with FIGS. 21 and 22).

Figure 24:
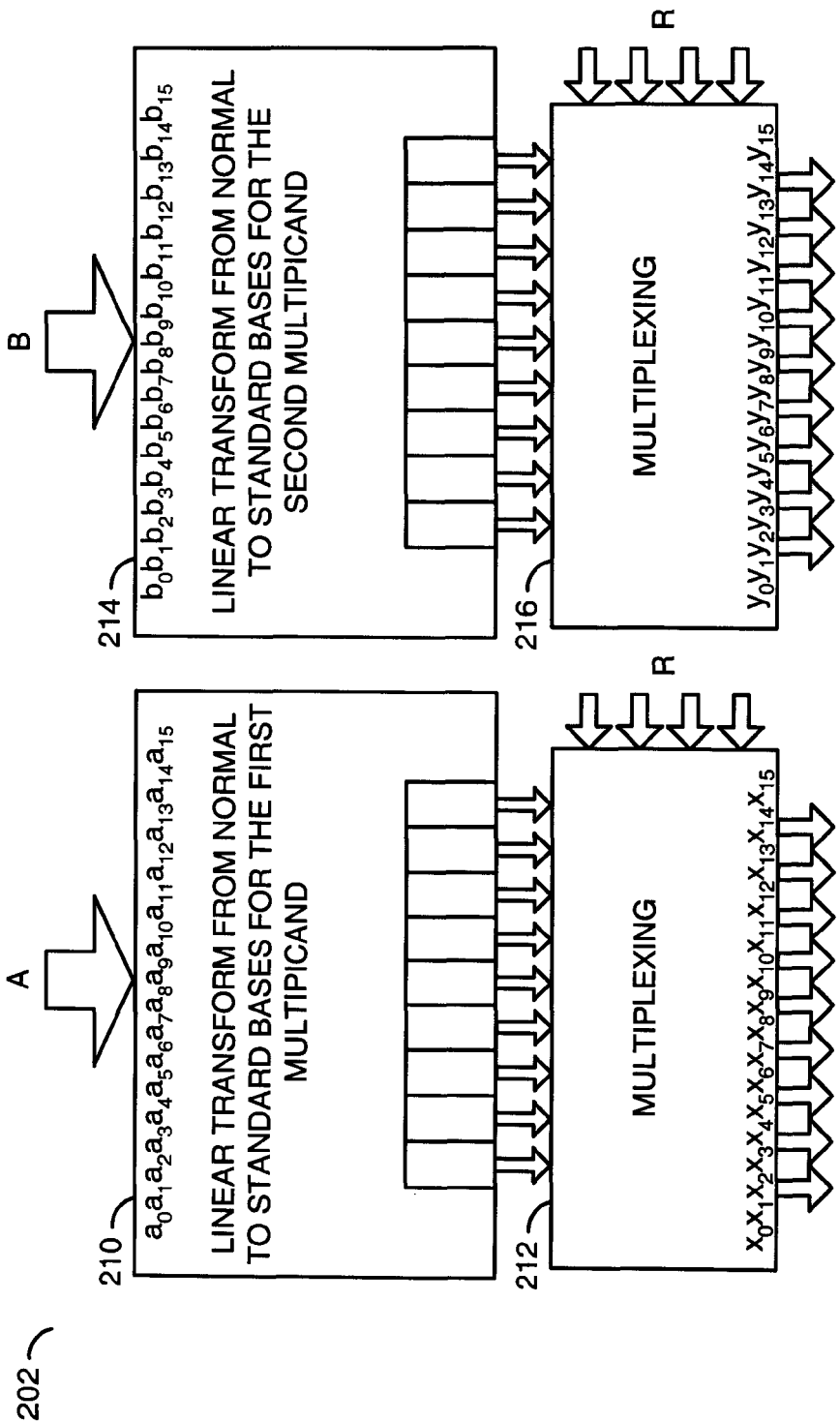
FIG. 24 is a diagram illustrating an example implementation of the linear transform form from normal to standard bases module of FIG. 23.

Referring to FIG. 24, a diagram is shown illustrating an example implementation of the block 202 of FIG. 23. The block 202 may comprise a block (or circuit) 210, a block (or circuit) 212, a block (or circuit) 214 and a block (or circuit) 216. The block 210 may be configured to perform a linear transform from the normal base to the standard base for the first multiplicand (e.g., A). The block 212 may comprise a multiplexing circuit. The block 214 may be configured to perform a linear transform from the normal base to the standard base for the second multiplicand (e.g., B). The block 216 may comprise a multiplexing circuit. The blocks 212 and 216 may be implemented similarly to the block 112 (described above in connection with FIGS. 21 and 22).

The block 206 (FIG. 23) and the blocks 210 and 214 may be implemented similarly. For example, each of the blocks 206, 210 and 214 may comprise nine submodules $L_i$, $i=0, \ldots, 9$. Each submodule $L_i$ has $8+i$ inputs and $8+i$ outputs and computes linear transform $L_i \cdot X_i$, where $X_i$ is a vector-column with $8+i$ components and $L_i$ is a $(8+i) \times (8+i)$-matrix.

Taking $i=0$ for example, the standard base is $$B_\alpha = \{1, \alpha, \alpha^2, \alpha^3, \ldots, \alpha^7\},$$

and the corresponding normal base is $$B^\alpha = \{\alpha, \alpha^2, \alpha^4, \alpha^8, \ldots, \alpha^{128}\},$$

where $\alpha$ is a root of the irreducible polynomial $P_0(x) = x^8 + x^7 + x^2 + x + 1$. The transition matrix from standard (polynomial) base $B_\alpha$ to the corresponding normal base $B^\alpha$ is equal to $M = (M_{i,j}) =$ $$\begin{pmatrix} 0 & 1 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 1 & 1 & 1 & 0 & 0 & 0 & 0 & 1 \\ 1 & 1 & 1 & 1 & 0 & 1 & 1 & 0 \\ 1 & 0 & 1 & 1 & 1 & 0 & 0 & 0 \\ 0 & 1 & 1 & 0 & 1 & 0 & 1 & 1 \\ 0 & 0 & 1 & 0 & 1 & 1 & 0 & 0 \end{pmatrix}$$

This means that $$\alpha^{2^i} = M_{i,0} + M_{i,1}\alpha + M_{i,2}\alpha^2 + \ldots + M_{i,7}\alpha^7, \quad i=0, \ldots, 7.$$

For example, $$\alpha^8 = 1 + \alpha + \alpha^2 + \alpha^7.$$

The transition matrix from the normal base $B^\alpha$ to the corresponding polynomial base $B^\alpha$ is equal to the inverse matrix to $M = (M^{-1}_{i,j}) =$ $$\begin{pmatrix} 1 & 1 & 1 & 1 & 1 & 1 & 1 & 1 \\ 1 & 0 & 0 & 0 & 0 & 0 & 0 & 0 \\ 0 & 1 & 0 & 0 & 0 & 0 & 0 & 0 \\ 1 & 0 & 0 & 1 & 1 & 0 & 1 & 1 \\ 0 & 0 & 1 & 0 & 0 & 0 & 0 & 0 \\ 0 & 1 & 1 & 0 & 0 & 0 & 0 & 1 \\ 1 & 1 & 0 & 0 & 1 & 1 & 0 & 1 \\ 0 & 0 & 1 & 0 & 1 & 1 & 1 & 1 \end{pmatrix}$$

If $X = (x_0, \ldots, x_7)$ is the coordinate vector of any element $GF(2^8)$ in the standard base $B_\alpha$, and the coordinate vector of the same element in the normal base $B^\alpha$ is $Y = (y_0, \ldots, y_7)$, then $$\Sigma x_i \alpha^i \Sigma y_i \alpha^{2^i} = \Sigma y_i (M_{i,0} + M_{i,1}\alpha + M_{i,2}\alpha^2 + \ldots + M_{i,7}\alpha^7)$$

$$x_j = \Sigma y_i M_{i,j}, \quad j=0, \ldots, 7,$$

consequently $$X^T = M^T \cdot Y^T, \quad Y^T = (M^T)^{-1} \times T = (M^{-1})^T X^T,$$

where the symbol T means transposition of the matrix.

The linear transform $X \to M \cdot X^T$ (or $X \to M^T \cdot X^T$) may be implemented as a circuit comprising 2-input XOR-cells. The size of such a circuit is equal to 17 and the depth is equal to 3. The size of an optimized circuit is less than or equal to 13 (for example the cover of given matrix by unit submatrix may be used). For any matrix M the minimal size of the circuit for performing the linear transform $X \to M \cdot X^T$ is the same as for performing the linear transform $X \to M^T \cdot X^T$ (but the depths may be different).

The linear transform module of the block 204 is generally configured to reduce modulo $P_i$, $i=0, \ldots, 8$ and may comprise, in one example, nine submodules, each configured to compute a respective $C(x) \mod P_i$, $i=0, \ldots, 8$. For example, the linear transform $C(x) \to Q(x) = C(x) \mod P_0$ may be represented by a formula $Q = S \cdot C^T$, where the matrix S comprises the following matrix:

$$\begin{pmatrix} 1 & 0 & 0 & 0 & 0 & 0 & 0 & 1 & 1 & 1 & 1 & 1 & 1 & 0 \\ 0 & 1 & 0 & 0 & 0 & 0 & 0 & 0 & 1 & 0 & 0 & 0 & 0 & 1 \\ 0 & 0 & 1 & 0 & 0 & 0 & 0 & 0 & 1 & 0 & 1 & 1 & 1 & 0 \\ 0 & 0 & 0 & 1 & 0 & 0 & 0 & 0 & 0 & 1 & 0 & 1 & 1 & 1 & 1 \\ 0 & 0 & 0 & 0 & 1 & 0 & 0 & 0 & 0 & 1 & 0 & 1 & 1 & 1 \\ 0 & 0 & 0 & 0 & 0 & 1 & 0 & 0 & 0 & 0 & 1 & 0 & 1 & 1 \\ 0 & 0 & 0 & 0 & 0 & 0 & 1 & 0 & 0 & 0 & 0 & 1 & 0 & 1 \\ 0 & 0 & 0 & 0 & 0 & 0 & 0 & 1 & 1 & 1 & 1 & 1 & 1 & 0 & 0 \end{pmatrix}$$

The linear transform $Q \to S \cdot C^T$ may be implemented as a circuit comprising 2-input XOR-cells. The size of the circuit is equal to 32 and the depth is equal to 3. The size of the optimized circuit may be less than or equal to 22. For brevity, only matrices M, $M^{-1}$, and S are presented below for other values of the indices $i=1, \ldots, 8$. The depth is given always for transposed matrix $M^T$ and $(M^{-1})^T$. For the polynomial: $1 + x^1 + x^4 + x^5 + x^6 + x^8 + x^9$, the transition matrix M from the standard base to the normal base may be implemented as follows:

$$\begin{pmatrix} 0 & 1 & 0 & 0 & 0 & 0 & 0 & 0 & 0 \\ 0 & 0 & 1 & 0 & 0 & 0 & 0 & 0 & 0 \\ 0 & 0 & 0 & 0 & 1 & 0 & 0 & 0 & 0 \\ 0 & 0 & 0 & 0 & 0 & 0 & 0 & 0 & 1 \\ 0 & 1 & 0 & 1 & 0 & 0 & 0 & 0 & 0 \\ 0 & 0 & 1 & 0 & 0 & 0 & 1 & 0 & 0 \\ 0 & 1 & 0 & 0 & 0 & 1 & 0 & 1 & 0 \\ 0 & 1 & 0 & 1 & 0 & 1 & 0 & 0 & 0 \\ 1 & 0 & 0 & 0 & 1 & 0 & 1 & 1 & 1 \end{pmatrix}$$

Complexity 9, depth 2. The transition matrix $M^{-1}$ from a normal base to the standard base may be as follows:

$$\begin{pmatrix} 1 & 1 & 1 & 1 & 1 & 1 & 1 & 1 & 1 \\ 1 & 0 & 0 & 0 & 0 & 0 & 0 & 0 & 0 \\ 0 & 1 & 0 & 0 & 0 & 0 & 0 & 0 & 0 \\ 1 & 0 & 0 & 0 & 1 & 0 & 0 & 0 & 0 \\ 0 & 0 & 1 & 0 & 0 & 0 & 0 & 0 & 0 \\ 0 & 0 & 0 & 0 & 1 & 0 & 0 & 1 & 0 \\ 0 & 1 & 0 & 0 & 0 & 1 & 0 & 0 & 0 \\ 1 & 0 & 0 & 0 & 1 & 0 & 1 & 1 & 0 \\ 0 & 0 & 0 & 1 & 0 & 0 & 0 & 0 & 0 \end{pmatrix}$$

Complexity 9, depth 2.

The matrix S for $C(x) \rightarrow Q(x) = C(x) \bmod P_1$ may be as follows:

1 0 0 0 0 0 0 0 0 1 1 1 1 0 0 1 1 0
0 1 0 0 0 0 0 0 0 1 0 0 1 0 1 0 1
0 0 1 0 0 0 0 0 0 0 1 0 0 1 0 1 0
0 0 0 1 0 0 0 0 0 0 0 1 0 0 1 0 1
0 0 0 0 1 0 0 0 0 1 1 1 1 0 1 0 0
0 0 0 0 0 1 0 0 0 1 0 0 1 1 1 0 0
0 0 0 0 0 0 1 0 0 1 0 1 0 1 0 0 0
0 0 0 0 0 0 0 1 0 0 1 0 1 0 1 0 0
0 0 0 0 0 0 0 0 1 1 1 0 0 1 1 0 0

Complexity 21, depth 3.

For the polynomial: $1+x^1+x^2+x^3+x^4+x^5+x^6+x^7+x^8+x^9+x^{10}$, the transition matrix M from the standard base to the normal base may be as follows:

0 1 0 0 0 0 0 0 0 0
0 0 1 0 0 0 0 0 0 0
0 0 0 1 0 0 0 0 0 0
0 0 0 0 0 0 0 0 1 0
0 0 0 0 0 1 0 0 0 0
1 1 1 1 1 1 1 1 1 1
0 0 0 0 0 0 0 0 0 1
0 0 0 0 0 0 0 1 0 0
0 0 0 1 0 0 0 0 0 0
0 0 0 0 0 0 1 0 0 0

Complexity 9, depth 1. The transition matrix $M^{-1}$ from the normal base to the standard base:

1 1 1 1 1 1 1 1 1 1
1 0 0 0 0 0 0 0 0 0
0 1 0 0 0 0 0 0 0 0
0 0 0 0 0 0 0 1 0 0
0 0 1 0 0 0 0 0 0 0
0 0 0 0 1 0 0 0 0 0
0 0 0 0 0 0 0 0 0 1
0 0 0 0 0 0 1 0 0 0
0 0 0 1 0 0 0 0 0 0
0 0 0 0 0 1 0 0 0 0

Complexity 9, depth 1.

The matrix S for $C(x) \rightarrow Q(x) = C(x) \bmod P_2$ may be as follows:

1 0 0 0 0 0 0 0 0 0 1 1 0 0 0 0 0 0
0 1 0 0 0 0 0 0 0 0 1 0 1 0 0 0 0 0
0 0 1 0 0 0 0 0 0 0 1 0 0 1 0 0 0 0
0 0 0 1 0 0 0 0 0 0 1 0 0 0 1 0 0 0
0 0 0 0 1 0 0 0 0 0 1 0 0 0 0 1 0 0
0 0 0 0 0 1 0 0 0 0 1 0 0 0 0 0 1 0
0 0 0 0 0 0 1 0 0 0 1 0 0 0 0 0 0 1
0 0 0 0 0 0 0 1 0 0 1 0 0 0 0 0 0 0
0 0 0 0 0 0 0 0 1 0 1 0 0 0 0 0 0 0
0 0 0 0 0 0 0 0 0 1 1 0 0 0 0 0 0 0

Complexity 18, depth 2.

For the polynomial: $1+x^2+x^3+x^4+x^8+x^{10}+x^{11}$, the transition matrix M from the standard base to the normal base may be as follows:

0 1 0 0 0 0 0 0 0 0 0
0 0 1 0 0 0 0 0 0 0 0
0 0 0 0 1 0 0 0 0 0 0
0 0 0 0 0 0 0 0 1 0 0
0 1 0 0 0 1 0 1 0 0 0
0 1 0 0 0 1 0 1 0 1 0
0 1 0 1 0 1 0 0 0 0 0
0 0 1 0 0 0 1 0 0 0 1
0 1 0 1 0 0 0 0 0 0 0
0 0 1 0 0 0 1 0 0 0 0
1 1 1 0 1 1 0 0 1 1 1

Complexity 12, depth 3. The transition matrix $M^{-1}$ from the normal base to the standard base may be as follows:

1 1 1 1 1 1 1 1 1 1 1
1 0 0 0 0 0 0 0 0 0 0
0 1 0 0 0 0 0 0 0 0 0
1 0 0 0 0 0 0 0 1 0 0
0 0 1 0 0 0 0 0 0 0 0
0 0 0 0 0 0 1 0 1 0 0
0 1 0 0 0 0 0 0 0 1 0
1 0 0 0 1 0 1 0 1 0 0
0 0 0 1 0 0 0 0 0 0 0
0 0 0 0 1 1 0 0 0 0 0
0 0 0 0 0 0 0 1 0 1 0

Complexity 12, depth 2.

The matrix S for C(x)→Q(x)=C(x) mod $P_3$ may be as follows:

$$\begin{matrix}
1 & 0 & 0 & 0 & 0 & 0 & 0 & 0 & 0 & 0 & 0 & 1 & 1 & 1 & 0 & 1 & 0 & 0 & 0 & 0 & 1 \\
0 & 1 & 0 & 0 & 0 & 0 & 0 & 0 & 0 & 0 & 0 & 1 & 1 & 1 & 0 & 1 & 0 & 0 & 0 & 0 \\
0 & 0 & 1 & 0 & 0 & 0 & 0 & 0 & 0 & 0 & 0 & 1 & 1 & 0 & 1 & 0 & 0 & 1 & 0 & 0 & 1 \\
0 & 0 & 0 & 1 & 0 & 0 & 0 & 0 & 0 & 0 & 1 & 0 & 0 & 0 & 0 & 0 & 1 & 0 & 1 \\
0 & 0 & 0 & 0 & 1 & 0 & 0 & 0 & 0 & 0 & 1 & 0 & 1 & 0 & 1 & 0 & 0 & 0 & 1 & 1 \\
0 & 0 & 0 & 0 & 0 & 1 & 0 & 0 & 0 & 0 & 0 & 1 & 0 & 1 & 0 & 1 & 0 & 0 & 0 & 1 \\
0 & 0 & 0 & 0 & 0 & 0 & 1 & 0 & 0 & 0 & 0 & 0 & 1 & 0 & 1 & 0 & 1 & 0 & 0 & 0 \\
0 & 0 & 0 & 0 & 0 & 0 & 0 & 1 & 0 & 0 & 0 & 0 & 0 & 1 & 0 & 1 & 0 & 1 & 0 & 0 \\
0 & 0 & 0 & 0 & 0 & 0 & 0 & 0 & 1 & 0 & 0 & 1 & 1 & 1 & 0 & 0 & 0 & 1 & 0 & 1 & 1 \\
0 & 0 & 0 & 0 & 0 & 0 & 0 & 0 & 0 & 1 & 0 & 0 & 1 & 1 & 1 & 0 & 0 & 0 & 1 & 0 & 1 \\
0 & 0 & 0 & 0 & 0 & 0 & 0 & 0 & 0 & 0 & 1 & 1 & 1 & 0 & 1 & 0 & 0 & 0 & 0 & 1 & 1
\end{matrix}$$

Complexity 37, depth 3.

For the polynomial: $1+x^1+x^2+x^3+x^4+x^5+x^6+x^7+x^8+x^9+x^{10}+x^{11}+x^{12}$, the transition matrix M from the standard base to the normal base may be as follows:

$$\begin{matrix}
0 & 1 & 0 & 0 & 0 & 0 & 0 & 0 & 0 & 0 & 0 & 0 \\
0 & 0 & 1 & 0 & 0 & 0 & 0 & 0 & 0 & 0 & 0 & 0 \\
0 & 0 & 0 & 0 & 1 & 0 & 0 & 0 & 0 & 0 & 0 & 0 \\
0 & 0 & 0 & 0 & 0 & 0 & 0 & 1 & 0 & 0 & 0 & 0 \\
0 & 0 & 0 & 1 & 0 & 0 & 0 & 0 & 0 & 0 & 0 & 0 \\
0 & 0 & 0 & 0 & 0 & 0 & 1 & 0 & 0 & 0 & 0 & 0 \\
1 & 1 & 1 & 1 & 1 & 1 & 1 & 1 & 1 & 1 & 1 & 1 \\
0 & 0 & 0 & 0 & 0 & 0 & 0 & 0 & 0 & 0 & 0 & 1 \\
0 & 0 & 0 & 0 & 0 & 0 & 0 & 0 & 0 & 1 & 0 & 0 \\
0 & 0 & 0 & 0 & 0 & 1 & 0 & 0 & 0 & 0 & 0 & 0 \\
0 & 0 & 0 & 0 & 0 & 0 & 0 & 0 & 0 & 0 & 1 & 0 \\
0 & 0 & 0 & 0 & 0 & 0 & 1 & 0 & 0 & 0 & 0
\end{matrix}$$

Complexity 11, depth 1. The transition matrix $M^{-1}$ from the normal base to the standard base may be as follows:

$$\begin{matrix}
1 & 1 & 1 & 1 & 1 & 1 & 1 & 1 & 1 & 1 & 1 & 1 \\
1 & 0 & 0 & 0 & 0 & 0 & 0 & 0 & 0 & 0 & 0 & 0 \\
0 & 1 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 \\
0 & 0 & 1 & 0 & 0 & 0 & 0 & 0 & 0 & 0 & 0 & 0 \\
0 & 0 & 0 & 0 & 0 & 0 & 0 & 1 & 0 & 0 & 0 & 0 \\
0 & 0 & 0 & 0 & 1 & 0 & 0 & 0 & 0 & 0 & 0 & 0 \\
0 & 0 & 0 & 0 & 0 & 0 & 0 & 0 & 0 & 0 & 0 & 1 \\
0 & 0 & 0 & 1 & 0 & 0 & 0 & 0 & 0 & 0 & 0 \\
0 & 0 & 0 & 0 & 0 & 0 & 0 & 0 & 0 & 1 & 0 & 0 \\
0 & 0 & 0 & 0 & 0 & 0 & 0 & 0 & 0 & 0 & 1 & 0 \\
0 & 0 & 0 & 0 & 0 & 0 & 1 & 0 & 0 & 0 & 0
\end{matrix}$$

Complexity 11, depth 1.

The matrix S for C(x)→Q(x)=C(x) mod $P_4$ may be as follows:

$$\begin{matrix}
1 & 0 & 0 & 0 & 0 & 0 & 0 & 0 & 0 & 0 & 0 & 1 & 1 & 0 & 0 & 0 & 0 & 0 & 0 & 0 & 0 \\
0 & 1 & 0 & 0 & 0 & 0 & 0 & 0 & 0 & 0 & 0 & 0 & 1 & 0 & 1 & 0 & 0 & 0 & 0 & 0 & 0 \\
0 & 0 & 1 & 0 & 0 & 0 & 0 & 0 & 0 & 0 & 0 & 0 & 1 & 0 & 0 & 1 & 0 & 0 & 0 & 0 & 0 \\
0 & 0 & 0 & 1 & 0 & 0 & 0 & 0 & 0 & 0 & 0 & 1 & 0 & 0 & 0 & 1 & 0 & 0 & 0 & 0 & 0 \\
0 & 0 & 0 & 0 & 1 & 0 & 0 & 0 & 0 & 0 & 0 & 0 & 1 & 0 & 0 & 0 & 1 & 0 & 0 & 0 & 0 \\
0 & 0 & 0 & 0 & 0 & 1 & 0 & 0 & 0 & 0 & 0 & 0 & 1 & 0 & 0 & 0 & 0 & 1 & 0 & 0 & 0 \\
0 & 0 & 0 & 0 & 0 & 0 & 1 & 0 & 0 & 0 & 0 & 0 & 1 & 0 & 0 & 0 & 0 & 0 & 1 & 0 & 0 \\
0 & 0 & 0 & 0 & 0 & 0 & 0 & 1 & 0 & 0 & 0 & 1 & 0 & 0 & 0 & 0 & 0 & 0 & 0 & 1 & 0 & 0 \\
0 & 0 & 0 & 0 & 0 & 0 & 0 & 0 & 1 & 0 & 0 & 0 & 1 & 0 & 0 & 0 & 0 & 0 & 0 & 1 & 0 \\
0 & 0 & 0 & 0 & 0 & 0 & 0 & 0 & 0 & 1 & 0 & 0 & 1 & 0 & 0 & 0 & 0 & 0 & 0 & 0 & 1 \\
0 & 0 & 0 & 0 & 0 & 0 & 0 & 0 & 0 & 0 & 1 & 0 & 1 & 0 & 0 & 0 & 0 & 0 & 0 & 0 & 0 \\
0 & 0 & 0 & 0 & 0 & 0 & 0 & 0 & 0 & 1 & 1 & 0 & 0 & 0 & 0 & 0 & 0 & 0 & 0 & 0
\end{matrix}$$

Complexity 22, depth 2.

For the polynomial: $1+x^3+x^4+x^7+x^{10}+x^{12}+x^{13}$, the transition matrix M from the standard base to the normal base may be as follows:

$$\begin{matrix}
0 & 1 & 0 & 0 & 0 & 0 & 0 & 0 & 0 & 0 & 0 & 0 \\
0 & 0 & 1 & 0 & 0 & 0 & 0 & 0 & 0 & 0 & 0 & 0 \\
0 & 0 & 0 & 0 & 1 & 0 & 0 & 0 & 0 & 0 & 0 & 0 \\
0 & 0 & 0 & 0 & 0 & 0 & 0 & 1 & 0 & 0 & 0 & 0 \\
0 & 1 & 1 & 1 & 1 & 0 & 0 & 1 & 1 & 1 & 1 & 1 \\
0 & 0 & 1 & 0 & 1 & 0 & 0 & 1 & 0 & 1 & 1 & 1 & 1 \\
0 & 1 & 1 & 1 & 0 & 0 & 1 & 0 & 1 & 0 & 0 & 0 & 0 \\
0 & 1 & 0 & 1 & 0 & 0 & 1 & 1 & 1 & 1 & 1 & 1 & 0 \\
0 & 0 & 1 & 0 & 1 & 1 & 0 & 1 & 1 & 1 & 1 & 0 & 0 \\
0 & 0 & 1 & 1 & 0 & 1 & 1 & 1 & 0 & 0 & 0 & 0 & 1 \\
1 & 1 & 0 & 1 & 0 & 0 & 1 & 1 & 1 & 0 & 0 & 0 & 0 \\
0 & 0 & 0 & 0 & 1 & 1 & 1 & 0 & 0 & 1 & 0 & 0 & 1 \\
0 & 1 & 0 & 1 & 1 & 1 & 1 & 0 & 0 & 1 & 0 & 1 & 0
\end{matrix}$$

Complexity 29, depth 3. The transition matrix $M^{-1}$ from the normal base to the standard base may be as follows:

$$\begin{matrix}
1 & 1 & 1 & 1 & 1 & 1 & 1 & 1 & 1 & 1 & 1 & 1 & 1 \\
1 & 0 & 0 & 0 & 0 & 0 & 0 & 0 & 0 & 0 & 0 & 0 & 0
\end{matrix}$$

0 1 0 0 0 0 0 0 0 0 0 0 0
1 0 0 1 1 1 0 0 0 0 0 0 0
0 0 1 0 0 0 0 0 0 0 0 0 0
0 0 0 0 1 0 0 0 1 0 0 1 1
0 1 0 0 1 1 1 0 0 0 0 0 0
1 0 1 1 1 1 0 1 1 1 0 1 1
0 0 0 1 0 0 0 0 0 0 0 0 0
0 1 0 0 0 0 0 1 1 0 0 0 1
1 0 0 0 0 1 0 0 0 1 0 0 1
0 0 1 1 1 0 1 1 0 0 0 1 1
0 0 1 0 0 1 1 1 0 0 0 0 0

Complexity 27, depth 3.
The matrix S for $C(x) \rightarrow Q(x) = C(x) \bmod P_5$ may be as follows:

1 0 0 0 0 0 0 0 0 0 0 0 0 0 1 1 1 0 1 0 1 1 0 0 0 0
0 1 0 0 0 0 0 0 0 0 0 0 0 0 0 1 1 1 0 1 0 1 1 0 0 0
0 0 1 0 0 0 0 0 0 0 0 0 0 0 0 0 1 1 1 0 1 0 1 1 0 0
0 0 0 1 0 0 0 0 0 0 0 0 0 0 1 1 1 1 0 1 1 0 0 1 1 0
0 0 0 0 1 0 0 0 0 0 0 0 0 1 0 0 1 0 0 0 0 0 0 0 1 1
0 0 0 0 0 1 0 0 0 0 0 0 0 0 1 0 0 1 0 0 0 0 0 0 0 1
0 0 0 0 0 0 1 0 0 0 0 0 0 0 0 1 0 0 1 0 0 0 0 0 0 0
0 0 0 0 0 0 0 1 0 0 0 0 0 0 1 1 1 1 0 0 1 0 0 0 0 0
0 0 0 0 0 0 0 0 1 0 0 0 0 0 0 1 1 1 1 0 0 1 0 0 0 0
0 0 0 0 0 0 0 0 0 1 0 0 0 0 0 0 1 1 1 1 0 0 1 0 0 0
0 0 0 0 0 0 0 0 0 0 1 0 0 1 0 0 1 1 1 1 0 1 0 0 0 1 0
0 0 0 0 0 0 0 0 0 0 0 1 0 0 1 0 0 1 1 1 1 0 1 0 0 0 1
0 0 0 0 0 0 0 0 0 0 0 0 1 1 1 0 1 0 1 1 0 0 0 0 0

Complexity 49, depth 3. A better normal base in $GF(2^{13})$ may be provided by the following polynomial: $1+x^2+x^3+x^4+x^5+x^6+x^7+x^8+x^9+x^{10}+x^{11}+x^{12}+x^{13}$. The transition matrix M from the standard base to the normal base may be as follows:

0 1 0 0 0 0 0 0 0 0 0 0 0
0 0 1 0 0 0 0 0 0 0 0 0 0
0 0 0 1 0 0 0 0 0 0 0 0 0
0 0 0 0 0 0 0 1 0 0 0 0 0
0 0 1 1 1 0 0 0 0 0 0 0 0
0 0 0 0 1 0 1 0 1 0 0 0 0
0 0 1 1 1 0 0 0 1 0 0 0 1
0 0 1 1 0 0 1 0 1 0 1 1 1
0 0 1 1 0 0 0 1 0 1 0 1 0
1 1 1 0 0 1 0 0 1 1 1 0 0

1 0 0 1 1 1 0 1 1 0 1 0 0
0 1 0 1 1 0 0 1 0 0 1 0 0
1 1 0 0 0 0 0 1 0 0 0 0 0

Complexity 27, depth 3.
The transition matrix $M^{-1}$ from the normal base to the standard one:

1 1 1 1 1 1 1 1 1 1 1 1 1
1 0 0 0 0 0 0 0 0 0 0 0 0
0 1 0 0 0 0 0 0 0 0 0 0 0
0 1 1 0 1 0 0 0 0 0 0 0 0
0 0 1 0 0 0 0 0 0 0 0 0 0

0 1 1 0 1 1 1 1 1 1 0 0 1
0 0 1 1 0 1 0 0 0 0 0 0 0
0 1 1 1 1 1 1 1 1 1 1 1 0
0 0 0 1 0 0 0 0 0 0 0 0 0
1 1 1 1 0 1 1 1 1 0 0 1 0
1 0 1 1 0 1 1 1 1 1 1 0 0
1 0 1 0 0 0 0 0 1 1 1 0 0
0 0 0 1 1 0 1 0 0 0 0 0 0

Complexity 26, depth 3.
The matrix S for $C(x) \to Q(x) = C(x) \bmod P_5$ may be as follows:

$$\begin{matrix}
1 & 0 & 0 & 0 & 0 & 0 & 0 & 0 & 0 & 0 & 0 & 0 & 1 & 1 & 0 & 0 & 0 & 0 & 0 & 0 & 0 & 0 & 0 \\
0 & 1 & 0 & 0 & 0 & 0 & 0 & 0 & 0 & 0 & 0 & 0 & 0 & 1 & 1 & 0 & 0 & 0 & 0 & 0 & 0 & 0 & 0 \\
0 & 0 & 1 & 0 & 0 & 0 & 0 & 0 & 0 & 0 & 0 & 0 & 1 & 1 & 1 & 1 & 0 & 0 & 0 & 0 & 0 & 0 & 0 \\
0 & 0 & 0 & 1 & 0 & 0 & 0 & 0 & 0 & 0 & 0 & 0 & 1 & 0 & 1 & 1 & 1 & 0 & 0 & 0 & 0 & 0 & 0 \\
0 & 0 & 0 & 0 & 1 & 0 & 0 & 0 & 0 & 0 & 0 & 0 & 1 & 0 & 0 & 1 & 1 & 1 & 0 & 0 & 0 & 0 & 0 \\
0 & 0 & 0 & 0 & 0 & 1 & 0 & 0 & 0 & 0 & 0 & 0 & 1 & 0 & 0 & 0 & 1 & 1 & 1 & 0 & 0 & 0 & 0 \\
0 & 0 & 0 & 0 & 0 & 0 & 1 & 0 & 0 & 0 & 0 & 0 & 1 & 0 & 0 & 0 & 0 & 1 & 1 & 1 & 0 & 0 & 0 \\
0 & 0 & 0 & 0 & 0 & 0 & 0 & 1 & 0 & 0 & 0 & 0 & 1 & 0 & 0 & 0 & 0 & 0 & 1 & 1 & 1 & 0 & 0 \\
0 & 0 & 0 & 0 & 0 & 0 & 0 & 0 & 1 & 0 & 0 & 0 & 1 & 0 & 0 & 0 & 0 & 0 & 0 & 1 & 1 & 1 & 0 \\
0 & 0 & 0 & 0 & 0 & 0 & 0 & 0 & 0 & 1 & 0 & 0 & 1 & 0 & 0 & 0 & 0 & 0 & 0 & 0 & 1 & 1 & 1 \\
0 & 0 & 0 & 0 & 0 & 0 & 0 & 0 & 0 & 0 & 1 & 0 & 1 & 0 & 0 & 0 & 0 & 0 & 0 & 0 & 0 & 1 & 1 \\
0 & 0 & 0 & 0 & 0 & 0 & 0 & 0 & 0 & 0 & 0 & 1 & 1 & 0 & 0 & 0 & 0 & 0 & 0 & 0 & 0 & 0 & 1 \\
\end{matrix}$$

Complexity 33, depth 3

For the polynomial: $1+x^1+x^8+x^9+x^{12}+x^{13}+x^{14}$, the transition matrix M from the standard base to the normal base may be as follows:

$$\begin{matrix}
0 & 1 & 0 & 0 & 0 & 0 & 0 & 0 & 0 & 0 & 0 & 0 & 0 & 0 \\
0 & 0 & 1 & 0 & 0 & 0 & 0 & 0 & 0 & 0 & 0 & 0 & 0 & 0 \\
0 & 0 & 0 & 0 & 1 & 0 & 0 & 0 & 0 & 0 & 0 & 0 & 0 & 0 \\
0 & 0 & 0 & 0 & 0 & 0 & 0 & 0 & 1 & 0 & 0 & 0 & 0 & 0 \\
0 & 1 & 0 & 1 & 0 & 0 & 0 & 0 & 0 & 1 & 0 & 1 & 0 & 1 \\
0 & 1 & 0 & 1 & 0 & 0 & 0 & 0 & 0 & 0 & 0 & 0 & 0 & 0 \\
0 & 0 & 1 & 0 & 0 & 0 & 1 & 0 & 0 & 0 & 0 & 0 & 0 & 0 \\
0 & 0 & 0 & 0 & 1 & 0 & 0 & 0 & 0 & 0 & 0 & 0 & 1 & 0 \\
0 & 1 & 0 & 1 & 0 & 1 & 0 & 0 & 0 & 0 & 0 & 0 & 0 & 0 \\
0 & 0 & 1 & 0 & 0 & 0 & 1 & 0 & 0 & 0 & 1 & 0 & 0 & 0 \\
0 & 1 & 0 & 0 & 0 & 1 & 0 & 1 & 0 & 1 & 0 & 0 & 0 & 0 \\
0 & 1 & 0 & 1 & 0 & 1 & 0 & 0 & 0 & 1 & 0 & 1 & 0 & 0 \\
0 & 1 & 0 & 0 & 0 & 1 & 0 & 1 & 0 & 0 & 0 & 0 & 0 & 0 \\
1 & 1 & 1 & 0 & 0 & 0 & 0 & 0 & 1 & 1 & 1 & 0 & 1 & 1 \\
\end{matrix}$$

Complexity 19, depth 3. The transition matrix $M^{-1}$ from the normal base to the standard base may be as follows:

$$\begin{matrix}
1 & 1 & 1 & 1 & 1 & 1 & 1 & 1 & 1 & 1 & 1 & 1 & 1 & 1 \\
1 & 0 & 0 & 0 & 0 & 0 & 0 & 0 & 0 & 0 & 0 & 0 & 0 & 0 \\
0 & 1 & 0 & 0 & 0 & 0 & 0 & 0 & 0 & 0 & 0 & 0 & 0 & 0 \\
1 & 0 & 0 & 0 & 0 & 1 & 0 & 0 & 0 & 0 & 0 & 0 & 0 & 0 \\
0 & 0 & 1 & 0 & 0 & 0 & 0 & 0 & 0 & 0 & 0 & 0 & 0 & 0 \\
0 & 0 & 0 & 0 & 0 & 1 & 0 & 0 & 1 & 0 & 0 & 0 & 0 & 0 \\
0 & 1 & 0 & 0 & 0 & 0 & 1 & 0 & 0 & 0 & 0 & 0 & 0 & 0 \\
1 & 0 & 0 & 0 & 0 & 1 & 0 & 0 & 1 & 0 & 0 & 0 & 1 & 0 \\
0 & 0 & 0 & 1 & 0 & 0 & 0 & 0 & 0 & 0 & 0 & 0 & 0 & 0 \\
0 & 0 & 0 & 0 & 0 & 0 & 0 & 0 & 0 & 0 & 1 & 0 & 1 & 0 \\
0 & 0 & 0 & 0 & 0 & 0 & 1 & 0 & 0 & 1 & 0 & 0 & 0 & 0 \\
0 & 0 & 0 & 0 & 0 & 0 & 0 & 0 & 1 & 0 & 1 & 1 & 1 & 0 \\
0 & 0 & 1 & 0 & 0 & 0 & 0 & 1 & 0 & 0 & 0 & 0 & 0 & 0 \\
0 & 0 & 0 & 0 & 1 & 1 & 0 & 0 & 1 & 0 & 0 & 1 & 0 & 0 \\
\end{matrix}$$

Complexity 19, depth 3.
The matrix S for $C(x) \to Q(x) = C(x) \bmod P_6$ may be as follows:

$$\begin{matrix}
1 & 0 & 0 & 0 & 0 & 0 & 0 & 0 & 0 & 0 & 0 & 0 & 0 & 1 & 1 & 0 & 1 & 1 & 1 & 0 & 0 & 1 & 1 & 0 & 0 & 0 \\
0 & 1 & 0 & 0 & 0 & 0 & 0 & 0 & 0 & 0 & 0 & 0 & 0 & 0 & 1 & 0 & 1 & 1 & 0 & 0 & 1 & 0 & 1 & 0 & 1 & 0 & 0 \\
0 & 0 & 1 & 0 & 0 & 0 & 0 & 0 & 0 & 0 & 0 & 0 & 0 & 0 & 0 & 1 & 0 & 1 & 1 & 0 & 0 & 1 & 0 & 1 & 0 & 1 & 0 \\
0 & 0 & 0 & 1 & 0 & 0 & 0 & 0 & 0 & 0 & 0 & 0 & 0 & 0 & 0 & 0 & 1 & 0 & 1 & 1 & 0 & 0 & 1 & 0 & 1 & 0 & 1 \\
0 & 0 & 0 & 0 & 1 & 0 & 0 & 0 & 0 & 0 & 0 & 0 & 0 & 0 & 0 & 0 & 0 & 1 & 0 & 1 & 1 & 0 & 0 & 1 & 0 & 1 & 0 \\
0 & 0 & 0 & 0 & 0 & 1 & 0 & 0 & 0 & 0 & 0 & 0 & 0 & 0 & 0 & 0 & 0 & 0 & 1 & 0 & 1 & 1 & 0 & 0 & 1 & 0 & 1 \\
0 & 0 & 0 & 0 & 0 & 0 & 1 & 0 & 0 & 0 & 0 & 0 & 0 & 0 & 0 & 0 & 0 & 0 & 0 & 1 & 0 & 1 & 1 & 0 & 0 & 1 & 0 \\
\end{matrix}$$

-continued

```
0 0 0 0 0 0 0 1 0 0 0 0 0 0 0 0 0 0 0 0 1 0 1 1 0 0 1
0 0 0 0 0 0 0 0 1 0 0 0 0 0 1 1 0 1 1 1 0 1 1 0 1 0 0
0 0 0 0 0 0 0 0 0 1 0 0 0 0 1 0 1 1 0 0 1 0 0 0 0 1 0
0 0 0 0 0 0 0 0 0 0 1 0 0 0 0 1 0 1 1 0 0 1 0 0 0 0 1
0 0 0 0 0 0 0 0 0 0 0 1 0 0 0 0 1 0 1 1 0 0 1 0 0 0 0
0 0 0 0 0 0 0 0 0 0 0 0 1 0 1 1 0 0 1 0 1 0 1 0 0 0 0
0 0 0 0 0 0 0 0 0 0 0 0 0 1 1 0 1 1 1 0 0 1 1 0 0 0 0
```

Complexity 53, depth 4.

For the polynomial: $1+x^2+x^4+x^5+x^7+x^9+x^{12}+x^{14}+x^{15}$, the transition matrix M from the standard base to the normal base may be as follows:

```
0 1 0 0 0 0 0 0 0 0 0 0 0 0 0
0 0 1 0 0 0 0 0 0 0 0 0 0 0 0
0 0 0 0 1 0 0 0 0 0 0 0 0 0 0
0 0 0 0 0 0 0 1 0 0 0 0 0 0 0
1 1 1 1 1 0 1 1 1 1 1 0 1 1 1
0 0 1 1 0 0 0 0 1 1 0 1 1 1 1
0 0 1 1 0 1 0 0 0 0 1 0 0 1 0
0 0 1 0 0 0 0 0 0 1 0 0 0 0 0
0 1 1 0 0 0 0 0 0 1 0 1 1 1 1
1 1 1 0 1 1 0 1 1 1 0 0 1 0 1
0 0 0 1 1 0 0 0 1 0 0 1 0 1 1
1 0 0 1 0 1 0 1 0 0 1 0 0 1 0
1 0 1 0 1 0 0 0 0 1 0 0 0 0 1
0 0 0 0 0 0 1 0 1 0 0 0 0 1 0
1 0 0 1 1 1 0 1 0 0 1 1 0 1 0
```

Complexity 35, depth 3. The transition matrix $M^{-1}$ from the normal base to the standard base may be as follows:

```
1 1 1 1 1 1 1 1 1 1 1 1 1 1 1
1 0 0 0 0 0 0 0 0 0 0 0 0 0 0
0 1 0 0 0 0 0 0 0 0 0 0 0 0 0
1 0 0 1 0 1 0 0 1 0 0 0 0 0 0
0 0 1 0 0 0 0 0 0 0 0 0 0 0 0
0 0 0 0 1 0 0 0 1 0 0 0 0 1 1
0 1 0 0 1 0 1 0 0 1 0 0 0 0 0
1 0 1 1 1 1 0 1 1 1 1 0 1 1 1
0 0 0 1 0 0 0 0 0 0 0 0 0 0 0
0 1 0 0 0 0 0 1 0 0 0 0 0 0 0
1 0 0 0 0 1 0 0 0 1 0 0 0 0 1
0 0 1 0 0 0 0 0 0 0 0 1 0 0 1
0 0 1 0 0 1 0 1 0 0 1 0 0 0 0
0 1 0 1 1 0 1 0 0 1 0 0 0 1 0
1 1 0 1 1 1 1 0 1 1 1 1 0 1 1
```

Complexity 35, depth 3.

The matrix S for $C(x) \rightarrow Q(x) = C(x) \bmod P_7$ may be as follows:

```
1 0 0 0 0 0 0 0 0 0 0 0 0 0 1 1 1 0 1 0 1 1 1 1 1 0 1 1
0 1 0 0 0 0 0 0 0 0 0 0 0 0 0 1 1 1 0 1 0 1 1 1 1 1 0 1
0 0 1 0 0 0 0 0 0 0 0 0 0 0 0 0 1 1 0 1 0 0 0 1 0 0 0 1 0 1
0 0 0 1 0 0 0 0 0 0 0 0 0 0 0 0 1 1 0 1 0 0 0 1 0 0 0 1 0
0 0 0 0 1 0 0 0 0 0 0 0 0 0 0 1 1 0 1 1 1 1 1 0 1 0 1 0
0 0 0 0 0 1 0 0 0 0 0 0 0 0 0 1 0 0 0 0 1 0 0 0 0 1 1 1 0
0 0 0 0 0 0 1 0 0 0 0 0 0 0 0 1 0 0 0 0 1 0 0 0 0 1 1 1
0 0 0 0 0 0 0 1 0 0 0 0 0 0 1 1 0 0 1 0 1 0 1 1 1 0 0 0
0 0 0 0 0 0 0 0 1 0 0 0 0 0 1 1 0 0 1 0 1 0 1 1 1 0 0
0 0 0 0 0 0 0 0 0 1 0 0 0 0 1 1 0 1 1 0 0 1 0 1 0 1 0 1
0 0 0 0 0 0 0 0 0 0 1 0 0 0 0 1 1 0 1 1 0 0 1 0 1 0 1 0
0 0 0 0 0 0 0 0 0 0 0 1 0 0 0 0 1 1 0 1 1 0 0 1 0 1 0 1
```

-continued

```
0 0 0 0 0 0 0 0 0 0 0 1 0 0 1 1 1 1 0 0 0 0 1 1 0 0 0 1
0 0 0 0 0 0 0 0 0 0 0 0 1 0 0 1 1 1 1 0 0 0 0 1 1 0 0 0
0 0 0 0 0 0 0 0 0 0 0 0 0 1 1 1 0 1 0 1 1 1 1 1 0 1 1 1
```

Complexity 78, depth 4.

For the polynomial: $1+x^5+x^{14}+x^{15}+x^{16}$, the transition matrix M from the standard base to the normal base may be as follows:

```
0 1 0 0 0 0 0 0 0 0 0 0 0 0 0 0
0 0 1 0 0 0 0 0 0 0 0 0 0 0 0 0
0 0 0 0 1 0 0 0 0 0 0 0 0 0 0 0
0 0 0 0 0 0 0 1 0 0 0 0 0 0 0 0
1 0 0 0 0 1 0 0 0 0 0 0 0 0 1 1
0 1 0 0 1 1 0 1 0 0 0 1 0 1 1 1
1 0 0 0 0 0 1 1 1 0 0 1 1 1 1 1
1 1 0 0 1 0 0 1 1 1 0 1 1 0 0 1
1 0 1 0 0 1 1 0 1 0 0 0 0 1 0 1
1 1 1 0 1 1 0 1 1 1 0 0 1 0 0 1
0 0 0 1 1 1 0 1 0 0 0 1 0 1 1 0
1 0 0 1 1 1 0 1 1 1 0 0 0 1 0 0
1 0 1 1 1 0 0 0 0 0 0 1 1 0 0 1
0 1 1 0 1 0 1 1 1 0 0 0 0 1 0 1
0 1 0 0 1 1 0 1 0 1 1 0 1 0 1 1
0 0 1 1 1 1 1 0 1 0 1 1 1 0 1 1
```

Complexity 59, depth 4. The transition matrix $M^{-1}$ from the normal base to the standard one:

```
1 1 1 1 1 1 1 1 1 1 1 1 1 1 1 1
1 0 0 0 0 0 0 0 0 0 0 0 0 0 0 0
0 1 0 0 0 0 0 0 0 0 0 0 0 0 0 0
0 0 1 0 0 1 1 0 1 1 0 1 0 0 0 0
0 0 1 0 0 0 0 0 0 0 0 0 0 0 0 0
0 1 0 1 0 0 1 1 0 0 1 0 0 0 1 1
0 0 0 1 0 0 1 1 0 1 1 0 1 0 0 0
0 0 0 0 1 1 0 0 0 1 0 1 1 0 0 0
0 0 0 1 0 0 0 0 0 0 0 0 0 0 0 0
1 1 1 1 0 1 1 1 0 0 0 0 0 0 0 0
1 0 1 0 1 0 0 1 1 0 0 1 0 0 0 1
0 0 0 1 0 0 1 0 0 1 1 0 0 0 1 1
0 0 0 0 1 0 0 1 1 0 1 1 0 1 0 0
0 1 0 0 1 1 0 1 1 1 0 0 0 1 0 0
0 0 0 0 0 1 1 0 0 0 1 0 1 1 0 0
1 0 1 0 0 0 1 0 1 1 1 1 0 0 0 0
```

Complexity 41, depth 3.

The matrix S for $C(x) \rightarrow Q(x) = C(x) \bmod P_8$ may be as follows:

```
1 0 0 0 0 0 0 0 0 0 0 0 0 0 0 0 1 1 0 1 1 0 1 1 0 1 1 1 1 0 0
0 1 0 0 0 0 0 0 0 0 0 0 0 0 0 0 0 1 1 0 1 1 0 1 1 0 1 1 1 1 0
0 0 1 0 0 0 0 0 0 0 0 0 0 0 0 0 0 0 1 1 0 1 1 0 1 1 0 1 1 1 1
0 0 0 1 0 0 0 0 0 0 0 0 0 0 0 0 0 0 0 1 1 0 1 1 0 1 1 0 1 1 1
0 0 0 0 1 0 0 0 0 0 0 0 0 0 0 0 0 0 0 0 1 1 0 1 1 0 1 1 0 1 1
0 0 0 0 0 1 0 0 0 0 0 0 0 0 0 0 1 1 0 1 1 1 0 1 1 0 1 0 0 0 1
0 0 0 0 0 0 1 0 0 0 0 0 0 0 0 0 0 1 1 0 1 1 0 1 1 0 1 1 0 0 0
0 0 0 0 0 0 0 1 0 0 0 0 0 0 0 0 0 0 1 1 0 1 1 1 0 1 1 0 1 0 0
0 0 0 0 0 0 0 0 1 0 0 0 0 0 0 0 0 0 0 1 1 0 1 1 1 0 1 1 0 1 0
0 0 0 0 0 0 0 0 0 1 0 0 0 0 0 0 0 0 0 0 1 1 0 1 1 1 0 1 1 0 1
0 0 0 0 0 0 0 0 0 0 1 0 0 0 0 0 0 0 0 0 0 1 1 0 1 1 1 0 1 1 0
0 0 0 0 0 0 0 0 0 0 0 1 0 0 0 0 0 0 0 0 0 0 1 1 0 1 1 1 0 1 1
0 0 0 0 0 0 0 0 0 0 0 0 1 0 0 0 0 0 0 0 0 0 0 1 1 0 1 1 1 1 0 1
0 0 0 0 0 0 0 0 0 0 0 0 0 1 0 0 0 0 0 0 0 0 0 0 1 1 0 1 1 1 0
0 0 0 0 0 0 0 0 0 0 0 0 0 0 1 0 1 1 0 1 1 0 1 1 0 0 0 1 0 1 1
0 0 0 0 0 0 0 0 0 0 0 0 0 0 0 1 1 0 1 1 0 1 1 0 1 1 0 1 1 1 0 0 1
```

Complexity 81, depth 4.

The normal multiplier module 200 may be implemented with a total size of less than 1153 XOR+893 AND(OR) and a depth of less than $15D_{XOR}+11D_{AND}$. Use of an unbalanced tree of OR-cells in the multiplexer submodules may decrease the depth on $2D_{AND}$. If Karatsuba construction is used for the polynomial multiplier within the block 204, the total size of the normal multiplier may be less than 1135 XOR+829 AND(OR) and the depth may be less than $15D_{XOR}+11D_{AND}$.

The linear transform module 124 may be represented as a circuit for performing the linear transform $X \rightarrow L \cdot X^T$, where L is the (108,31)-matrix given below.

```
1 0 0 0 0 0 0 0 1 1 1 1 1 0
0 1 0 0 0 0 0 0 1 0 0 0 0 1
0 0 1 0 0 0 0 0 1 0 1 1 1 0
0 0 0 1 0 0 0 0 1 0 1 1 1 1
0 0 0 0 1 0 0 0 0 1 0 1 1 1
0 0 0 0 0 1 0 0 0 0 1 0 1 1
0 0 0 0 0 0 1 0 0 0 0 1 0 1
0 0 0 0 0 0 1 1 1 1 1 1 0 0
1 0 0 0 0 0 0 0 0 1 1 1 0 0 1 1 0
0 1 0 0 0 0 0 0 0 1 0 0 1 0 1 0 1
0 0 1 0 0 0 0 0 0 0 1 0 0 1 0 1 0
0 0 0 1 0 0 0 0 0 0 1 0 0 1 0 1
0 0 0 0 1 0 0 0 0 1 1 1 1 0 1 0 0
0 0 0 0 0 1 0 0 0 1 0 0 1 1 1 0 0
0 0 0 0 0 0 1 0 0 1 0 1 0 1 0 0 0
0 0 0 0 0 0 0 1 0 0 1 0 1 0 1 0 0
0 0 0 0 0 0 0 0 1 1 1 0 0 1 1 0 0
1 0 0 0 0 0 0 0 0 0 1 1 0 0 0 0 0 0
0 1 0 0 0 0 0 0 0 0 1 0 1 0 0 0 0 0
0 0 1 0 0 0 0 0 0 0 1 0 0 1 0 0 0 0
0 0 0 1 0 0 0 0 0 0 1 0 0 0 1 0 0 0 0
0 0 0 0 1 0 0 0 0 0 1 0 0 0 0 1 0 0 0
0 0 0 0 0 1 0 0 0 0 1 0 0 0 0 0 1 0 0
0 0 0 0 0 0 1 0 0 0 1 0 0 0 0 0 0 1 0
0 0 0 0 0 0 0 1 0 0 1 0 0 0 0 0 0 0 1
0 0 0 0 0 0 0 0 1 0 1 0 0 0 0 0 0 0 0
0 0 0 0 0 0 0 0 0 1 1 0 0 0 0 0 0 0 0
1 0 0 0 0 0 0 0 0 0 0 1 1 1 0 1 0 0 0 0 1
0 1 0 0 0 0 0 0 0 0 0 0 1 1 1 0 1 0 0 0 0
0 0 1 0 0 0 0 0 0 0 0 1 1 0 1 0 0 1 0 0 1
0 0 0 1 0 0 0 0 0 0 0 1 0 0 0 0 0 0 1 0 1
0 0 0 0 1 0 0 0 0 0 0 1 0 1 0 1 0 0 0 1 1
0 0 0 0 0 1 0 0 0 0 0 0 1 0 1 0 1 0 0 0 1
0 0 0 0 0 0 1 0 0 0 0 0 0 1 0 1 0 1 0 0 0
0 0 0 0 0 0 0 1 0 0 0 0 0 0 1 0 1 0 1 0 0
0 0 0 0 0 0 0 0 1 0 0 1 1 1 0 0 0 1 0 1 1
0 0 0 0 0 0 0 0 0 1 0 0 1 1 1 0 0 0 1 0 1
0 0 0 0 0 0 0 0 0 0 1 1 1 0 1 0 0 0 0 1 1
1 0 0 0 0 0 0 0 0 0 0 0 0 1 1 0 0 0 0 0 0 0 0
```

-continued

```
0 1 0 0 0 0 0 0 0 0 0 0 1 0 1 0 0 0 0 0 0 0 0
0 0 1 0 0 0 0 0 0 0 0 0 1 0 0 1 0 0 0 0 0 0 0
0 0 0 1 0 0 0 0 0 0 0 0 1 0 0 0 1 0 0 0 0 0 0
0 0 0 0 1 0 0 0 0 0 0 0 1 0 0 0 0 1 0 0 0 0 0
0 0 0 0 0 1 0 0 0 0 0 0 1 0 0 0 0 0 1 0 0 0 0
0 0 0 0 0 0 1 0 0 0 0 0 1 0 0 0 0 0 0 1 0 0 0
0 0 0 0 0 0 0 1 0 0 0 0 1 0 0 0 0 0 0 0 1 0 0
0 0 0 0 0 0 0 0 1 0 0 0 1 0 0 0 0 0 0 0 0 1 0
0 0 0 0 0 0 0 0 0 1 0 0 1 0 0 0 0 0 0 0 0 0 1
0 0 0 0 0 0 0 0 0 0 1 0 1 0 0 0 0 0 0 0 0 0 0
0 0 0 0 0 0 0 0 0 0 0 1 1 0 0 0 0 0 0 0 0 0 0
1 0 0 0 0 0 0 0 0 0 0 0 1 1 0 0 0 0 0 0 0 0 0
0 1 0 0 0 0 0 0 0 0 0 0 0 1 1 0 0 0 0 0 0 0 0
0 0 1 0 0 0 0 0 0 0 0 0 1 1 1 1 0 0 0 0 0 0 0
0 0 0 1 0 0 0 0 0 0 0 0 1 0 1 1 1 0 0 0 0 0 0
0 0 0 0 1 0 0 0 0 0 0 0 1 0 0 1 1 1 0 0 0 0 0
0 0 0 0 0 1 0 0 0 0 0 0 1 0 0 0 1 1 1 0 0 0 0
0 0 0 0 0 0 1 0 0 0 0 0 1 0 0 0 0 1 1 1 0 0 0
0 0 0 0 0 0 0 1 0 0 0 0 1 0 0 0 0 0 1 1 1 0 0
0 0 0 0 0 0 0 0 1 0 0 0 1 0 0 0 0 0 0 1 1 1 0
0 0 0 0 0 0 0 0 0 1 0 0 1 0 0 0 0 0 0 0 1 1 1
0 0 0 0 0 0 0 0 0 0 1 0 1 0 0 0 0 0 0 0 0 1 1
0 0 0 0 0 0 0 0 0 0 0 1 1 0 0 0 0 0 0 0 0 0 1
1 0 0 0 0 0 0 0 0 0 0 0 1 1 0 1 1 1 0 0 1 1 0 0 0
0 1 0 0 0 0 0 0 0 0 0 0 0 1 0 1 1 0 0 1 0 1 0 1 0 0
0 0 1 0 0 0 0 0 0 0 0 0 0 0 1 0 1 1 0 0 1 0 1 0 1 0
0 0 0 1 0 0 0 0 0 0 0 0 0 0 0 1 0 1 1 0 0 1 0 1 0 1
0 0 0 0 1 0 0 0 0 0 0 0 0 0 0 0 1 0 1 1 0 0 1 0 1 0
0 0 0 0 0 1 0 0 0 0 0 0 0 0 0 0 0 1 0 1 1 0 0 1 0 1
0 0 0 0 0 0 1 0 0 0 0 0 0 0 0 0 0 0 1 0 1 1 0 0 1 0
0 0 0 0 0 0 0 1 0 0 0 0 0 0 0 0 0 0 0 1 0 1 1 0 0 1
0 0 0 0 0 0 0 0 1 0 0 0 0 0 1 1 0 1 1 1 0 1 1 0 1 0 0
0 0 0 0 0 0 0 0 0 1 0 0 0 0 1 0 1 1 0 0 1 0 0 0 0 1 0
0 0 0 0 0 0 0 0 0 0 1 0 0 0 1 0 1 1 0 0 1 0 0 0 0 0 1
0 0 0 0 0 0 0 0 0 0 0 1 0 0 0 1 0 1 1 0 0 1 0 0 0 0 0
0 0 0 0 0 0 0 0 0 0 0 0 1 0 1 1 0 0 1 0 1 0 1 0 0 0 0
0 0 0 0 0 0 0 0 0 0 0 0 0 1 1 0 1 1 1 0 0 1 1 0 0 0 0
1 0 0 0 0 0 0 0 0 0 0 0 0 1 1 1 0 1 0 1 1 1 1 1 0 1 1
0 1 0 0 0 0 0 0 0 0 0 0 0 0 1 1 1 0 1 0 1 1 1 1 1 0 1
0 0 1 0 0 0 0 0 0 0 0 0 0 0 1 1 0 1 0 0 0 1 0 0 0 1 0 1
0 0 0 1 0 0 0 0 0 0 0 0 0 0 1 1 0 1 0 0 0 1 0 0 0 1 0
0 0 0 0 1 0 0 0 0 0 0 0 0 0 1 1 0 1 1 1 1 1 1 0 1 0 1 0
0 0 0 0 0 1 0 0 0 0 0 0 0 0 0 1 0 0 0 0 1 0 0 0 0 1 1 1 0
```

-continued

```
0 0 0 0 0 0 1 0 0 0 0 0 0 0 0 0 1 0 0 0 0 1 0 0 0 0 0 1 1 1
0 0 0 0 0 0 0 1 0 0 0 0 0 0 0 0 1 1 0 0 1 0 1 0 1 1 1 0 0 0
0 0 0 0 0 0 0 0 1 0 0 0 0 0 0 0 1 1 0 0 1 0 1 0 1 1 1 0 0
0 0 0 0 0 0 0 0 0 1 0 0 0 0 0 1 1 0 1 1 0 0 1 0 1 0 1 0 1
0 0 0 0 0 0 0 0 0 0 1 0 0 0 0 0 1 1 0 1 1 0 0 1 0 1 0 1 0
0 0 0 0 0 0 0 0 0 0 0 1 0 0 0 0 0 1 1 0 1 1 0 0 1 0 1 0 1
0 0 0 0 0 0 0 0 0 0 0 0 1 0 0 1 1 1 1 0 0 0 0 1 1 0 0 0 1
0 0 0 0 0 0 0 0 0 0 0 0 0 1 0 0 1 1 1 1 0 0 0 0 1 1 0 0 0
0 0 0 0 0 0 0 0 0 0 0 0 0 0 1 1 1 0 1 0 1 1 1 1 0 1 1 1
1 0 0 0 0 0 0 0 0 0 0 0 0 0 0 1 1 0 1 1 0 1 1 0 1 1 1 1 0 0
0 1 0 0 0 0 0 0 0 0 0 0 0 0 0 0 1 1 0 1 1 0 1 1 0 1 1 1 1 0
0 0 1 0 0 0 0 0 0 0 0 0 0 0 0 0 1 1 0 1 1 0 1 1 0 1 1 1 1
0 0 0 1 0 0 0 0 0 0 0 0 0 0 0 0 0 1 1 0 1 1 0 1 1 0 1 1 1
0 0 0 0 1 0 0 0 0 0 0 0 0 0 0 0 0 0 1 1 0 1 1 0 1 1 0 1 1
0 0 0 0 0 1 0 0 0 0 0 0 0 0 0 1 1 0 1 1 1 0 1 1 0 1 0 0 0 1
0 0 0 0 0 0 1 0 0 0 0 0 0 0 0 1 1 0 1 1 1 0 1 1 0 1 0 0 0
0 0 0 0 0 0 0 1 0 0 0 0 0 0 0 0 1 1 0 1 1 1 0 1 1 0 1 0 0
0 0 0 0 0 0 0 0 1 0 0 0 0 0 0 0 0 1 1 0 1 1 1 0 1 1 0 1 0
0 0 0 0 0 0 0 0 0 1 0 0 0 0 0 0 0 0 1 1 0 1 1 1 0 1 1 0 1
0 0 0 0 0 0 0 0 0 0 1 0 0 0 0 0 0 0 0 1 1 0 1 1 1 0 1 1 0
0 0 0 0 0 0 0 0 0 0 0 1 0 0 0 0 0 0 0 0 1 1 0 1 1 1 0 1 1
0 0 0 0 0 0 0 0 0 0 0 0 1 0 0 0 0 0 0 0 0 1 1 0 1 1 1 0 1
0 0 0 0 0 0 0 0 0 0 0 0 0 1 0 0 0 0 0 0 0 0 1 1 0 1 1 1 0
0 0 0 0 0 0 0 0 0 0 0 0 0 0 1 0 1 1 0 1 1 0 1 1 0 0 0 1 0 1 1
0 0 0 0 0 0 0 0 0 0 0 0 0 0 0 1 1 0 1 1 0 1 1 0 1 1 1 0 0 1
```

The matrix L may be partially optimized as above by using covers for separated submatrices. Additional optimization of the full (108,31)-matrix may be performed to unite submatrices.

A similar method of optimization may be applied to the modules 210 and 214 configured to perform the linear transform from normal bases to standard bases for the first and second multiplicand. The united matrix has a size of (108,16) in both cases.

The depth of the multiplier 204 may also be decreased. At first, the module configured to reduce the result of multiplication modulo $P_i$ and the module configured to perform the linear transform from the standard bases to the normal bases may be combined in one module configured to perform the linear transform with a (108,31)-matrix similar to the matrix described above in connection with FIG. 9. For example, the linear transform performed by the module corresponding to the matrix of FIG. 9 is a superposition of the linear transforms corresponding to the modules configured to reduce the result of multiplication modulo $P_i$ and perform the linear transform from the standard bases to the normal bases. The depth of the corresponding circuit for the (108,31) linear transform is 5. The total depth of modules configured to reduce the result of multiplication modulo $P_i$ and perform the linear transform from the standard bases to the normal bases is 7. Consequently, the total depth of the whole multiplier may be less than $13D_{XOR}+11D_{AND}$. The size may be less than $31\cdot16+29\cdot15+27\cdot14+25\cdot13+23\cdot12+21\cdot11+19\cdot10+17\cdot9+15\cdot8-108=2242$. However, the complexity (number of ones) of a particular matrix is essentially less than 2000.

The circuit may be optimized by applying a method similar to the method described above as well as other well-known methods. An upper bound on the size of the circuit may be determined without computing the matrix. If (a,b)-matrix contains N ones, then the size of the circuit for the (a,b)-matrix is less than or equal to N−a. The negation of the (a,b)-matrix has ab−N ones and may be computed by a circuit with the size ab−N−a. Using the circuit for negation of a given matrix, the circuit for the matrix may be constructed with a size of ab−N+b−1. The depth of the circuit increases by 1. The size of minimal circuits is less than (ab+b−a+1)/2 in any case. Applying this bound to each submatrix with sizes (31,16), (29,15), . . . , (15,8), the total bound may be determined as 1229. The upper bound for the depth of the circuit is 6. The real values of depth and size are less than the values given earlier.

Another upper bound on the size of the circuit may be determined without computing of the matrix. All inputs $x_1, \ldots, x_{31}$ are separated on blocks $X_1=(x_1, \ldots, x_6), \ldots, x_4=(x_{19}, \ldots, x_{24}), x_5=(x_{25}, \ldots x_{31})$. For any $i=1,\ldots,4$ the module computing all linear forms on variables from $X_i$ consists of $2^6-7=54$ XOR cells and has the depth of 3. The module computing all linear forms on variables from $X_5$ may be comprised of $2^3-4+15+16=35$ XOR cells and may have a depth of 3 (see FIG. 9 above). Using this module and in addition $2\cdot 8+2\cdot 9+3\cdot 10+3\cdot 11+3\cdot 12+4\cdot 13+\ldots +4\cdot 16=365$ XOR cells, the circuit for any (108,31) linear transform may be constructed (see FIG. 9 above). The size of the circuit is $365+4\cdot 54+35=616$ and the depth is 6. Consequently the total size of the normal base multiplier constructed above is less than 1225 XOR+893 AND(OR) and the depth is less than $14D_{XOR}+11D_{AND}$.

The size of the multiplier presented may be compared with the straightforward multiplier constructed from Hasan-Reyhani-Masoleh (HMR) multipliers in $GF(2^n)$, $n=8,\ldots ,16$ used in parallel. The size of HMR-multiplier in normal base B for $GF(2^n)$ equals $n(C_B+3n-2)/2$, where $C_B$ is the complexity of base B (number of ones in Massey-Omura matrix of B). For optimal normal base of type 1 the size is equal $2n^2-1$. The minimal values of complexity of normal bases in $GF(2^n)$, $n=8,\ldots ,16$ are 29, 17, 19, 21, 23, 45, 27, 45, 85. Hence, the size of the straightforward multiplier is $(8(29+22)+9(17+25)+2\cdot 10^2-1+11(21+31)+2\cdot 12^2-1+13(45+37)+14(27+40)+15(45+43)+16(85+46))/2+212=3844$. The depth is equal to $8D_{XOR}+6D_{AND}$.

The straightforward standard base multiplier constructed from Mastrovito multipliers in $GF(2^n)$, $n=8,\ldots ,16$ used in parallel, has the size $(8^2+7^2)+(9^2+8^2)+(10^2+9^2)+(11^2+10^2)+(12^2+11^2)+(13^2+12^2)+(14^2+13^2)+(15^2+14^2)+(16^2+15^2)+365+212=3082$. The depth is equal $8D_{XOR}+6D_{AND}$.

Figure 25:
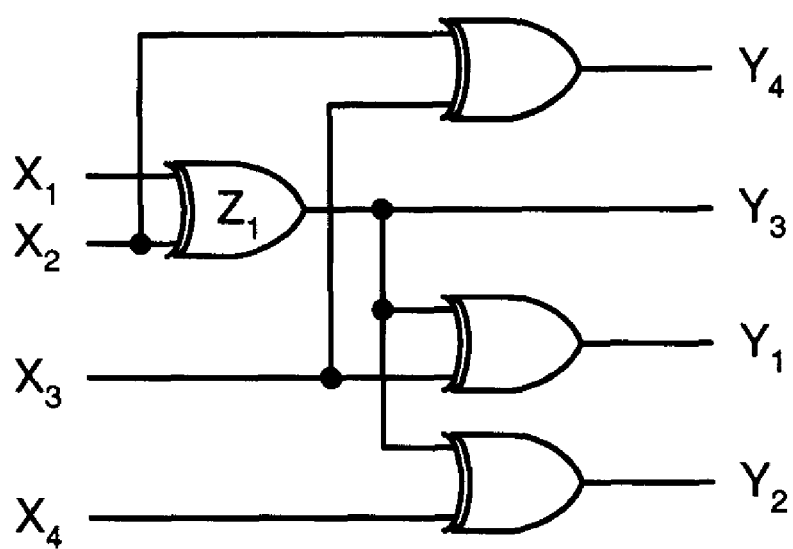
FIG. 25 is a diagram illustrating a circuit based on a matrix and taking into account cover with units-submatrices.

Referring to FIG. 25, a diagram is shown illustrating a circuit 300 for computing a linear transform based on a matrix and taking into account cover with units-submatrices. The techniques described below may utilized in the realization the matrices presented above. In one example, a matrix may be defined as follows:

$$\begin{matrix} 1 & 1 & 1 & 0 \\ 1 & 1 & 0 & 1 \\ 1 & 1 & 0 & 0 \\ 0 & 1 & 1 & 0 \end{matrix}$$

that computes the following linear transform:

$y_1=x_1+x_2+x_3$, $y_2=x_1+x_2+x_4$, $y_3=x_1+x_2$, $y_4=x_2+x_3$.

Using a cover of one 2×3 unit-submatrix and four 1×1 unit-submatrices, the XOR circuit 300 may be constructed for the above transform as follows:

$z_1=x_1+x_2$, $y_1=z_1+x_3$, $y_2=z_1+x_4$, $y_3=z_1$, $y_4=x_2+x_3$.

Implementing each of the above equations as a single XOR gate generally results in the circuit 300.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a multiplier circuit configured to multiply a first multiplicand and a second multiplicand based on a programmable base value and generate a plurality of intermediate values, each intermediate value representing a result of the multiplication reduced by a respective irreducible polynomial; and
a multiplexing circuit configured to generate an output in response to the plurality of intermediate values from the multiplier circuit and said programmable base value.

2. The apparatus according to claim 1, wherein said multiplier circuit comprises:
a binary-unary encoder circuit configured to generate a code value in response to said programmable base value;
a plurality of double conjunction modules configured to modify a first portion of said first multiplicand and a first portion of said second multiplicand in response to said code value;
a polynomial multiplier circuit configured to generate a product value by multiplying said first multiplicand as modified by said plurality of double conjunction modules with said second multiplicand as modified by said plurality of double conjunction modules; and
a linear transform circuit configured to generate each of said plurality of intermediate values by reducing said product value by the respective irreducible polynomial.

3. The apparatus according to claim 2, wherein said binary-unary encoder comprises:
a first circuit configured to bitwise AND a first input and a second input;
a second circuit configured to bitwise AND said first input and a third input;
a third circuit configured to bitwise AND said second input and said third input;
a fourth circuit configured to bitwise AND an output of said second circuit and said second input;
a fifth circuit configured to bitwise OR said third input and a fourth input;
a sixth circuit configured to bitwise OR an output of said first circuit and an output of said fifth circuit;
a seventh circuit configured to bitwise OR an output of said third circuit and said fourth input;
an eighth circuit configured to bitwise OR an output of said fifth circuit and said second input;
a ninth circuit configured to bitwise OR said fourth input and an output of said fourth circuit;
a tenth circuit configured to bitwise OR said output of said second circuit and an output of said seventh circuit; and
an eleventh circuit configured to bitwise OR said first input and an output of said eighth circuit.

4. The apparatus according to claim 2, wherein said multiplier circuit further comprises:
a normal base to standard base transform circuit; and
a standard base to normal base transform circuit.

5. The apparatus according to claim 4, wherein said normal base to standard base transform circuit further comprises:
a first linear transform circuit configured to transform said first multiplicand from normal to standard bases;
a first multiplexing circuit configured to multiplex outputs of said first linear transform circuit in response to a control input;
a second linear transform circuit configured to transform said second multiplicand from normal to standard bases; and a second multiplexing circuit configured to multiplex outputs of said second linear transform circuit in response to said control input.

6. The apparatus according to claim 2, wherein said linear transform circuit comprises a plurality of submodules, each configured to reduce an output of said polynomial multiplier by a respective modulus.

7. The apparatus according to claim 2, wherein said linear transform circuit comprises a plurality of submodules, each configured to reduce an output of said polynomial multiplier by a respective irreducible polynomial over a field GF(2).

8. The apparatus according to claim 7, wherein said respective irreducible polynomial comprise a polynomial selected from the group consisting of:

$P_0 = x^8 + x^4 + x^3 + x + 1$, $P_1 = x^9 + x + 1$, $P_2 = x^{10} + x^3 + 1$, $P_3 = x^{11} + x^2 + 1$, $P_4 = x^{12} + x^3 + 1$, $P_5 = x^{13} + x^4 + x^3 + x + 1$, $P_6 = x^{14} + x^5 + 1$, $P_7 = x^{15} + x + 1$, and $P_8 = x^{16} + x^5 + x^3 + x + 1$.

9. The apparatus according to claim 1, wherein the multiplier circuit is optimized using a cover of units-submatrices.

10. An apparatus comprising:
means for multiplying a first multiplicand and a second multiplicand based on a programmable base value and generating a plurality of intermediate values, each intermediate value representing a result of the multiplication reduced by a respective irreducible polynomial; and
means for generating an output in response to the plurality of outputs of the multiplying means and said programmable base value.

11. A method of universal Galois field multiplication comprising the steps of:
using a circuit to multiply a first multiplicand and a second multiplicand based on a programmable base value and generate a plurality of intermediate values, each intermediate value representing a result of the multiplication reduced by a respective irreducible polynomial; and
generating an output in response to the plurality of intermediate values and said programmable base value.

12. The method according to claim 11, wherein multiplying said first multiplicand and said second multiplicand based on said programmable base value comprises:
generating a code value in response to said programmable base value;
modifying a first portion of said first multiplicand and a first portion of said second multiplicand in response to said code value;
generating a product value by multiplying said first multiplicand as modified with said second multiplicand as modified; and
generating each of said plurality of intermediate values by reducing said product value by the respective irreducible polynomial.

13. The method according to claim 12, wherein generating said code value in response to said programmable base value comprises the steps of:
(A) receiving said programmable base value as a first input, a second input, a third input and a fourth input;
(B) bitwise ANDing said first input and said second input;
(C) bitwise ANDing said first input and said third input;
(D) bitwise ANDing said second input and said third input;
(E) bitwise ANDing a result of step (C) and said second input;
(F) bitwise ORing said third input and said fourth input;
(G) bitwise ORing a result of step (B) and a result of step (F);
(H) bitwise ORing a result of step (D) and said fourth input;
(I) bitwise ORing a result of step (F) and said second input;
(J) bitwise ORing said fourth input and a result of step (E);
(K) bitwise ORing the result of step (C) and a result of step (H); and
(L) bitwise ORing said first input and a result of step (I).

14. The method according to claim 12, wherein multiplying said first multiplicand and said second multiplicand comprises:
performing a normal base to standard base transformation; and
performing a standard base to normal base transformation.

15. The method according to claim 14, wherein said normal base to standard base transformation comprises:
a first linear transformation configured to transform said first multiplicand from normal to standard bases;
multiplexing a result of said first linear transformation in response to a control input;
a second linear transformation configured to transform said second multiplicand from normal to standard bases; and
multiplexing a result of said second linear transformation in response to said control input.

16. The method according to claim 12, wherein reducing said product value by the respective irreducible polynomial is performed over a field GF(2).

17. The method according to claim 16, wherein said respective irreducible polynomial comprise a polynomial selected from the group consisting of:

$P_0 = x^8 + x^4 + x^3 + x + 1$, $P_1 = x^9 + x + 1$, $P_2 = x^{10} + x^3 + 1$, $P_3 = x^{11} + x^2 + 1$, $P_4 = x^{12} + x^3 + 1$, $P_5 = x^{13} + x^4 + x^3 + x + 1$, $P_6 = x^{14} + x^5 + 1$, $P_7 = x^{15} + 1$, and $P_8 = x^{16} + x^5 + x^3 + x + 1$.

18. The method according to claim 11, wherein said circuit comprises a multiplier circuit.

19. The method according to claim 11, wherein said output is generated using a second circuit.

20. The method according to claim 19, wherein said second circuit comprises a multiplexing circuit.

* * * * *